United States Patent [19]
Fukushima et al.

[11] Patent Number: 5,311,327
[45] Date of Patent: May 10, 1994

[54] FACSIMILE MACHINE INCLUDING IMAGE MEMORY CAPABLE OF EFFICIENT TRANSMISSION/RECEPTION

[75] Inventors: Shigenobu Fukushima, Yao; Hiroaki Hamano, Hirakata, both of Japan

[73] Assignee: Minolta Camera Kabushiki Kaisha, Osaka, Japan

[21] Appl. No.: 787,886

[22] Filed: Nov. 5, 1991

[30] Foreign Application Priority Data

Nov. 10, 1990 [JP] Japan .................................. 2-305096
Nov. 10, 1990 [JP] Japan .................................. 2-305097

[51] Int. Cl.$^5$ .............................................. H04N 1/40
[52] U.S. Cl. ................................... 358/444; 358/468; 358/439; 358/404
[58] Field of Search ............... 358/404, 403, 407, 444, 358/468, 435, 437-439; 395/115, 117; 379/100; H04N 1/40

[56] References Cited

U.S. PATENT DOCUMENTS

| | | | |
|---|---|---|---|
| 4,573,083 | 2/1986 | Shimizu | 358/407 |
| 4,713,780 | 12/1987 | Schultz et al. | 379/96 |
| 4,791,556 | 12/1988 | Vilkaitis | 395/159 |
| 4,907,094 | 3/1990 | Mishima et al. | 358/404 |
| 5,038,226 | 8/1991 | Nagaishi | 358/404 |
| 5,068,745 | 11/1991 | Shimura | 358/444 |
| 5,130,809 | 7/1992 | Takayanagi | 358/444 |

FOREIGN PATENT DOCUMENTS

| | | | |
|---|---|---|---|
| 0184886 | 10/1983 | Japan | 358/444 |
| 60-8670 | 3/1985 | Japan . | |
| 61-34712 | 8/1986 | Japan . | |
| 63-2461 | 1/1988 | Japan . | |

Primary Examiner—Edward L. Coles, Sr.
Assistant Examiner—Jill Jackson
Attorney, Agent, or Firm—Willian Brinks Hofer Gilson & Lione

[57] ABSTRACT

A facsimile machine including a reading device for reading an original image to be transmitted, a memory for storing the read image information, a transmission device for transmitting the stored image information to an external device, a timer for detecting the elapse of a prescribed time from completion of a prescribed operation of the facsimile machine, and an erasure device for erasing the stored image information in response to the detection output of the prescribed time by the timer.

32 Claims, 22 Drawing Sheets

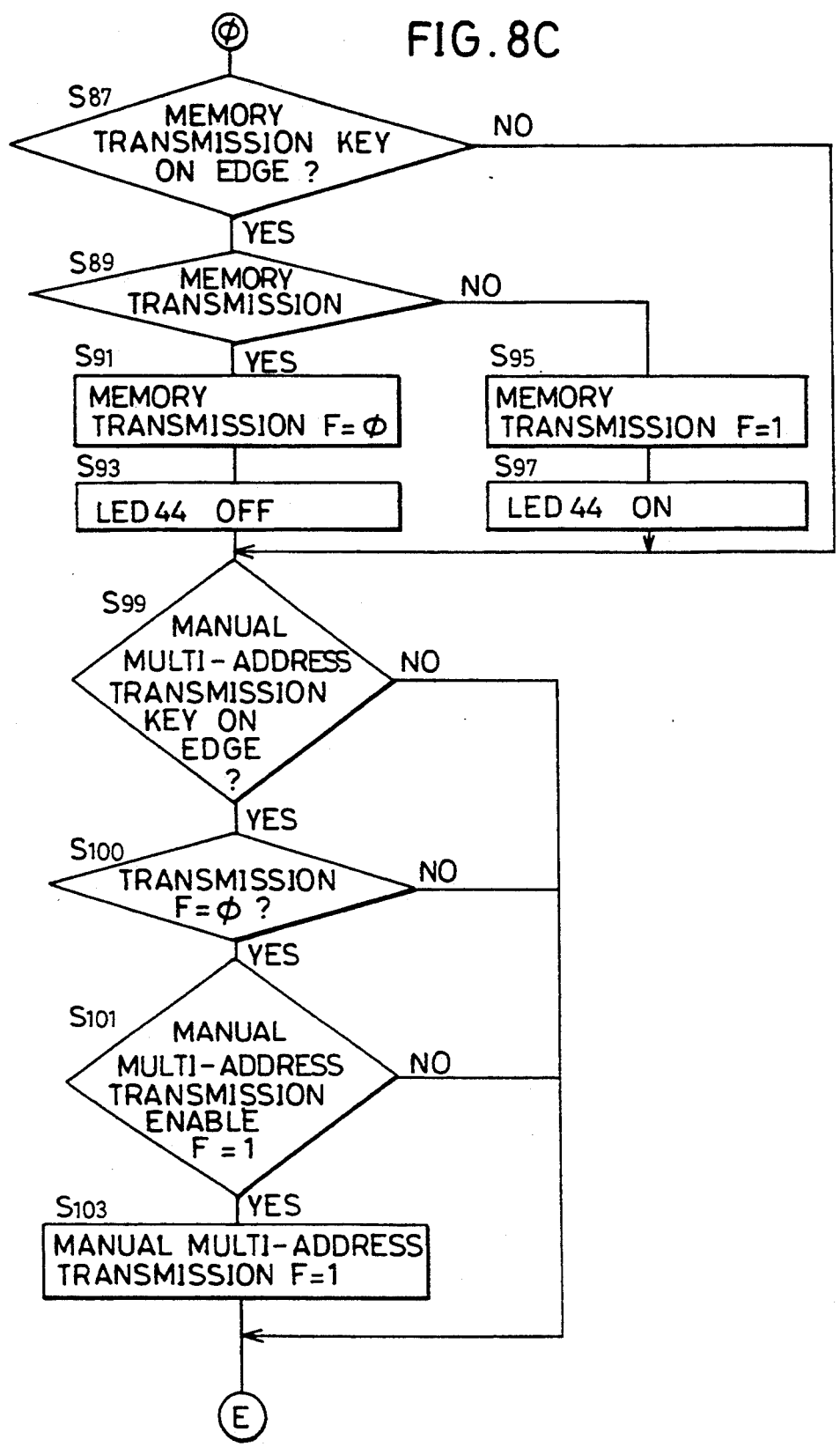

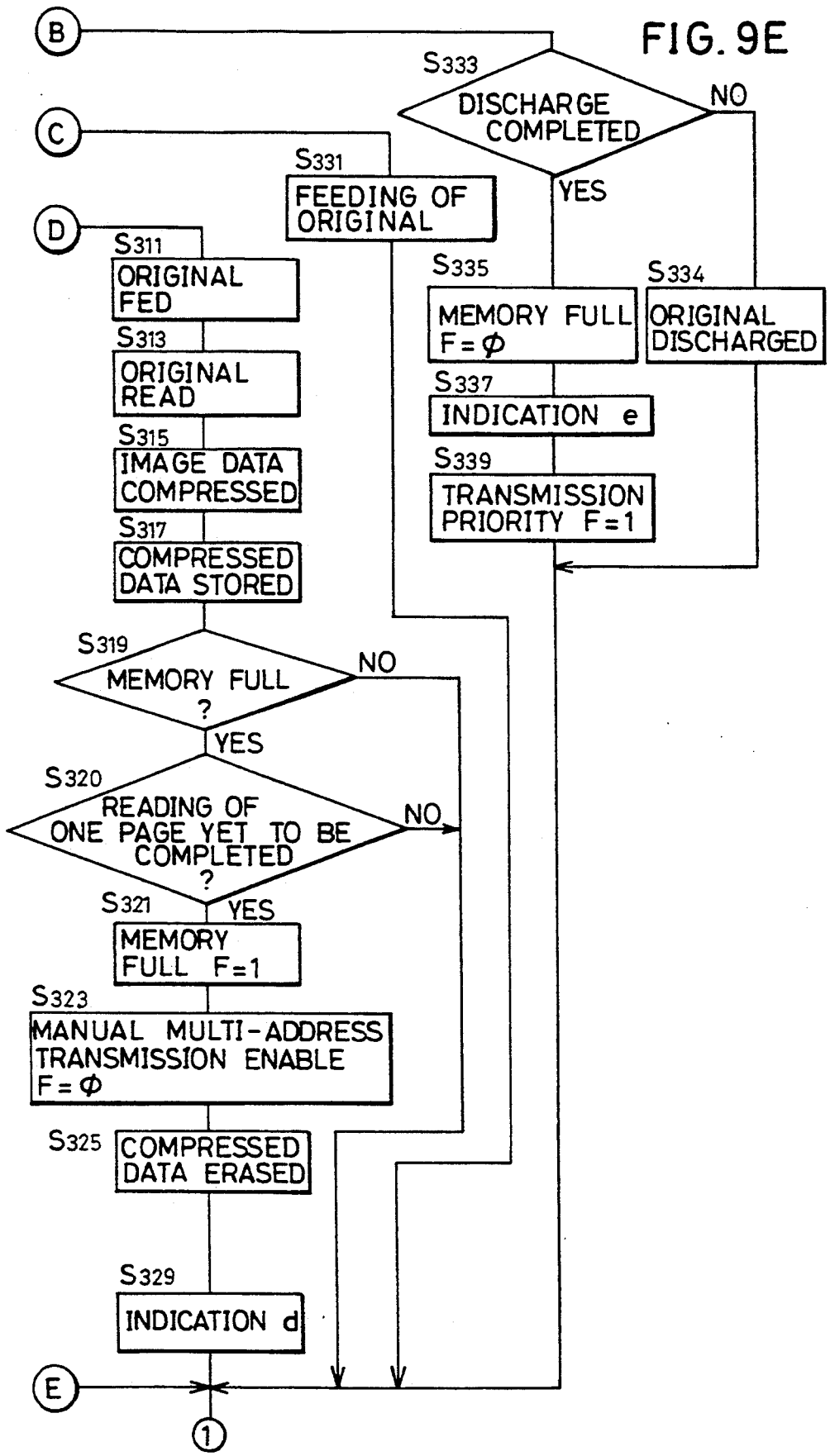

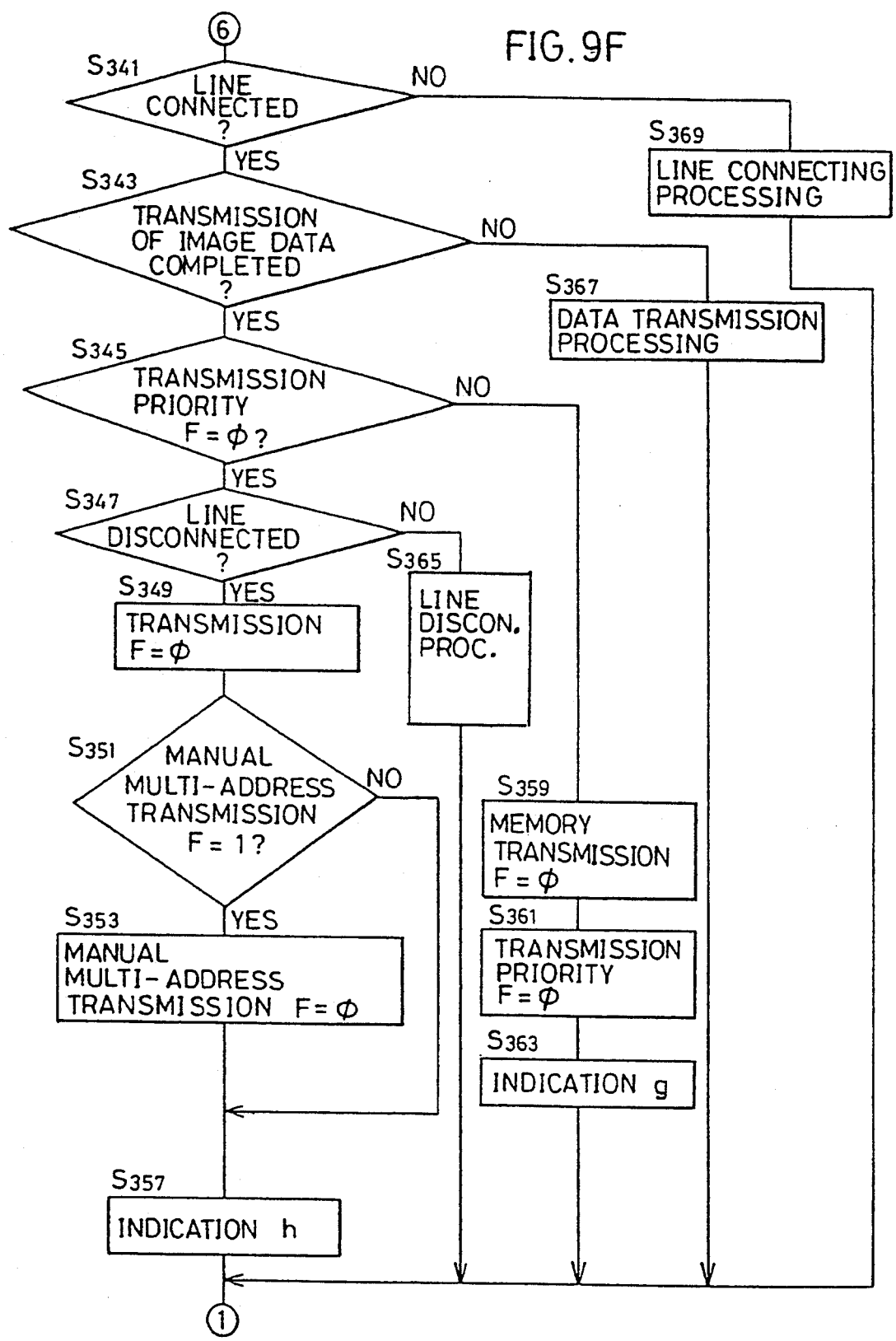

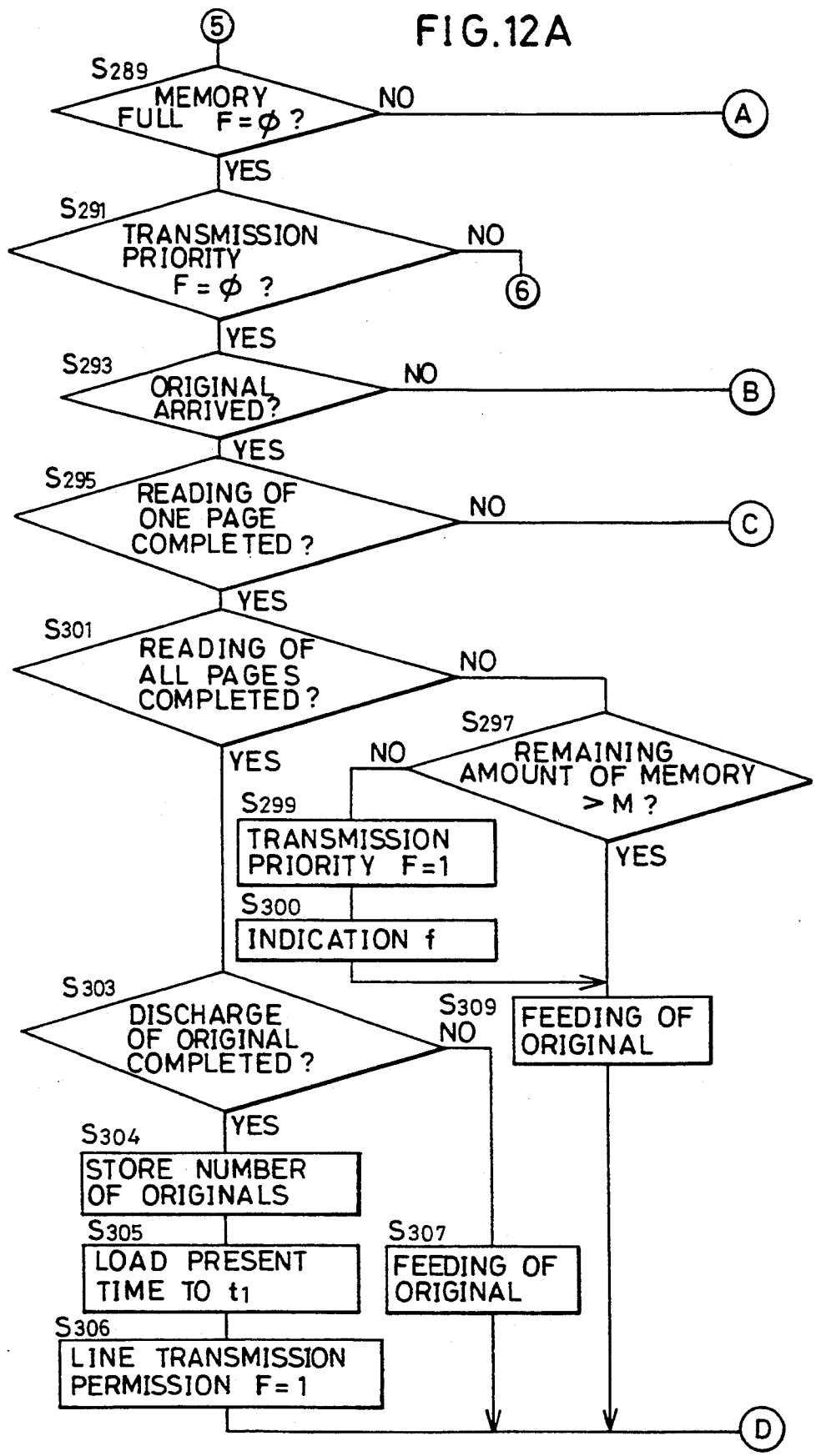

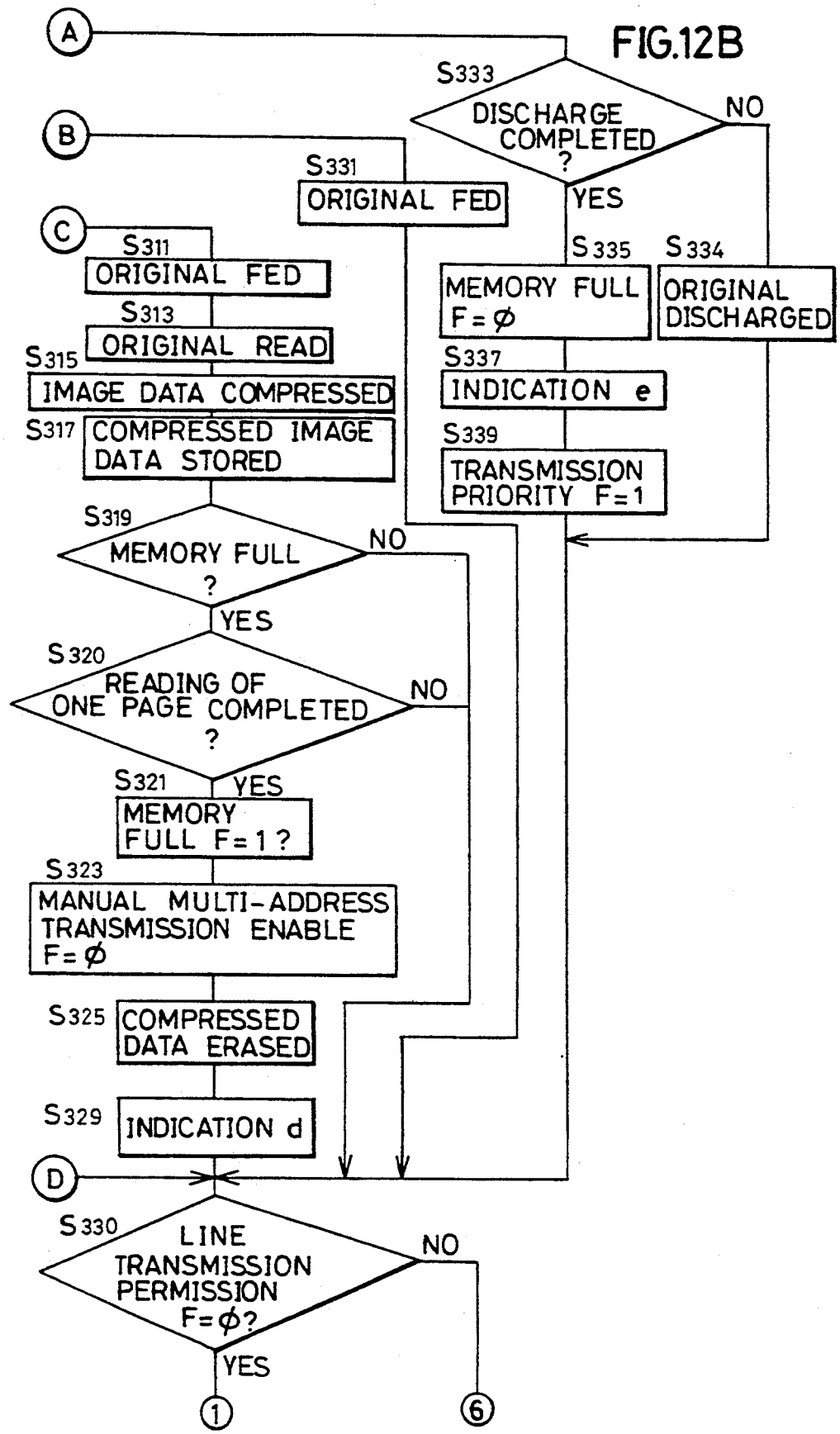

FACSIMILE MACHINE INCLUDING IMAGE MEMORY CAPABLE OF EFFICIENT TRANSMISSION/RECEPTION

BACKGROUND OF THE INVENTION

1. Field of the Invention

The present invention relates generally to a facsimile machine, and more specifically, to a facsimile machine capable of manual transmission of information to a desired receiving device after the same information is already transmitted.

2. Description of the Related Art

Japanese Patent Publication No. 60-8670 discloses a multi-address transmission device configured to store data in the storage portion simultaneously with the transmission of data to the first receiving device, and to perform simultaneous transmission to the second receiving device and seq. while reading out the data stored in the storage portion.

In a multi-address transmission device as described above, the other party to which information is to be transmitted should be set in the first place, and another reading of an original is necessary if the same original is further transmitted to somewhere else after the transmission to the set party.

SUMMARY OF THE INVENTION

It is an object of the present invention to render a multi-address transmission device easier to handle in use.

Another object of the present invention is to provide effective use of a memory in a multi-address transmission device.

Yet another object of the present invention is to improve reliability upon use of a memory in a multi-address transmission device.

In order to achieve these objects, a multi-address transmission device in accordance with an aspect of the present invention includes reading means for reading an original image to be transmitted, storage means for storing the read image information, transmitting means for transmitting the stored image information to an external device, timer means for detecting the elapse of a prescribed time period after completion of a prescribed operation by a facsimile machine, and erasure means for erasing image information stored in the storage means.

Having such a structure, the multi-address transmission device permits efficient use of a memory, because image information stored in the storage means is erased after the elapse of a prescribed time period.

In order to achieve the above-described objects, a multi-address transmission device in accordance with another aspect of the present invention includes reading means for reading an original image to be transmitted, transmission means for transmitting the image information read by the reading means, storage means for storing the read image information simultaneously with the transmission operation by the transmission means, operation means for instructing transmission of the image information stored in the storage means, control means for controlling the transmission means to transmit once again the image information stored in the storage means in response to the operation of the operation means, timer means for detecting the elapse of a prescribed time period after completion of the transmission operation by the transmission means, and erasure means for erasing the image information stored in the storage means.

Having such a structure, the multi-address transmission device is easier to handle, because after image information is read out and transmitted, the image information stored can be transmitted once again.

In order to achieve the above-described objects, a multi-address transmission device in accordance with still another aspect of the present invention includes reading means for reading the image of an original to be transmitted, transmission means for transmitting the read image information to external devices, storage means for storing the read information simultaneously with the transmission operation by the transmission means, operation means for instructing transmission of the stored image information, control means for controlling the transmission means to transmit the stored image information once again in response to the operation of the operation means, and printing means for printing out information for determining the contents of the stored image information.

A multi-address transmission device having a structure as described above is capable of preventing erroneous memory transmission from taking place, because the information for determining the contents of the stored image information is printed out.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 8A to 8D are flow charts each showing the specific contents of transmission check routine shown in FIG. 6;

FIGS. 9A to 9F are flow charts each showing the specific contents of the transmission routine shown in FIG. 7;

FIGS. 12A to 12B are flow charts each showing the embodiment shown in FIG. 11, corresponding to FIGS. 9D to 9E showing the former embodiment;

DESCRIPTION OF THE PREFERRED EMBODIMENTS

Figure 1:
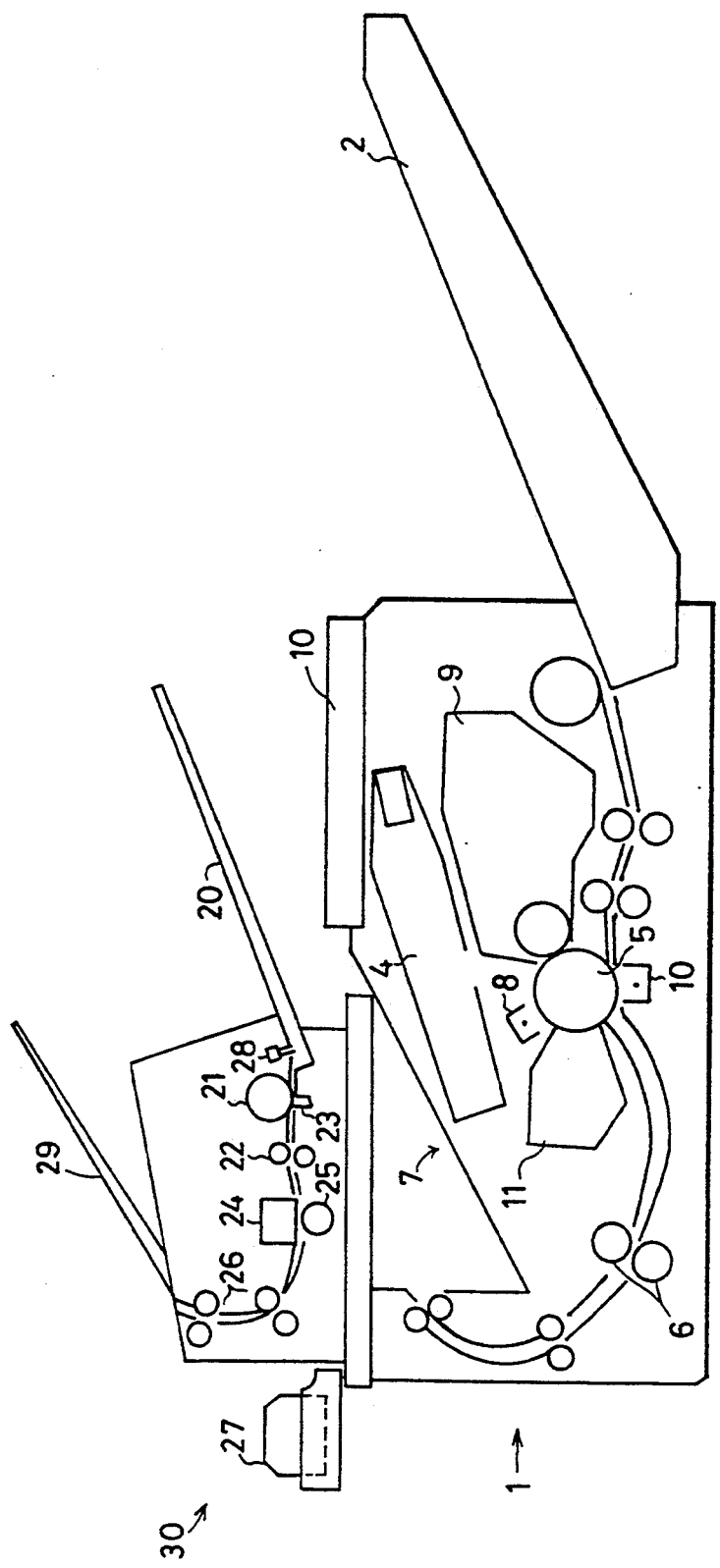
FIG. 1 is a sectional view showing a facsimile machine in accordance with an embodiment of the present invention.

FIG. 1 is a sectional view showing a facsimile machine used in one embodiment of the present invention.

The facsimile machine is largely divided into a storage portion 1 and a reading portion 30. Storage portion 1 is specifically a laser beam printer, the operation of which will be briefly described in the following.

A photoreceptor drum 5 is charged by a charger 8, and an electrostatic latent image is formed by an optics 4. The toner of a developing unit 9 sticks to this image. Cut paper is set to a feed paper cassette 2, and is fed one by one through rollers.

The toner sticking to the photoreceptor is transferred onto a sheet of paper by a transfer charger 10, and is discharged onto a tray 7 after being fixed by a fixing device 6. Toner which has not sticked is collected by a cleaner 11, thus completing one cycle of printing.

Now, description will be provided on the operation of reading portion 30.

Originals set at an original tray 20 are detected by a sensor 28, and have their ends lifted to a prescribed position by a lifting plate 23. Then, the originals are prepared sequentially from the top one and fed. The fed original is transported by rollers 22, 25 and 26, read by an image sensor of close contact type 24 as a digital image, and is finally discharged onto a discharge tray 29.

A hand set 27 for interface with communication lines is provided in the reading portion. An operation panel 10 for setting various operation modes of transmission/reception is disposed under original tray 20.

Figure 2:
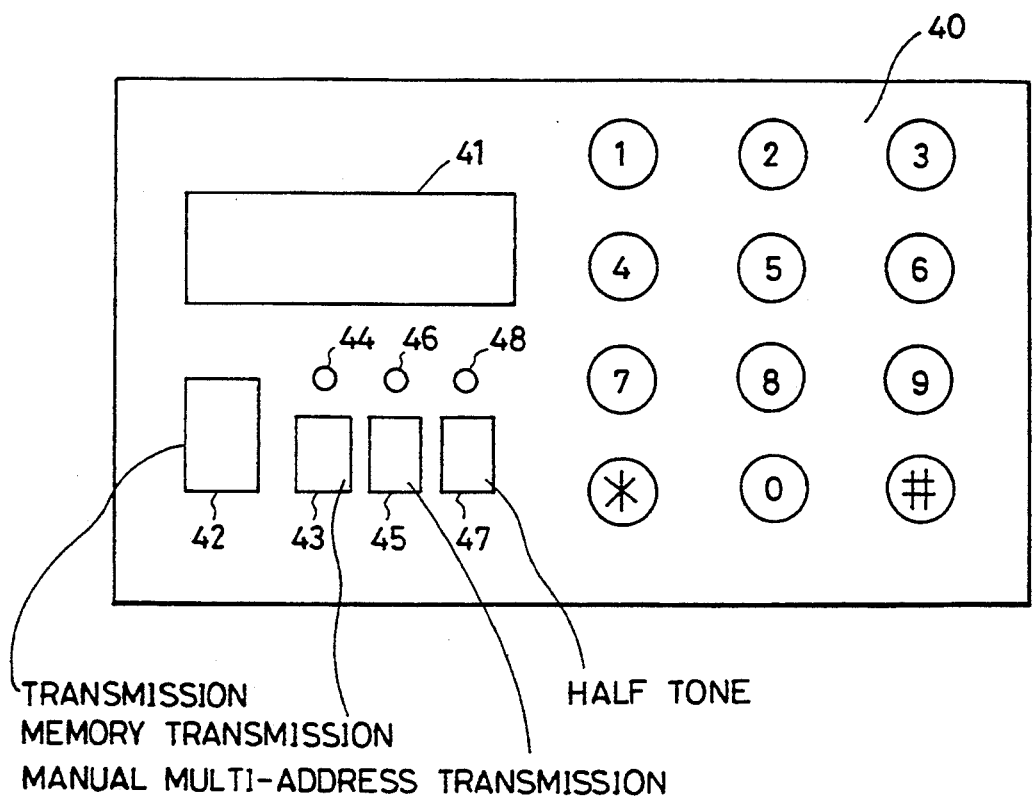
FIG. 2 is a top plan view showing the operation panel shown in FIG. 1.

FIG. 2 is a top plan view showing an outer view of the operation panel of FIG. 1.

The operation panel includes a ten key group 40, a liquid crystal panel 41, operation keys 42, 43, 45 and 47, and LEDs (Light Emitting Diodes) 44, 46 and 48.

Ten key 40 is used for inputting the dial number of the other party to which an image is transmitted. Liquid crystal panel 41 is used for indicating the operation state of the facsimile machine or instructions to an operator. Key 42 is used for initiating the transmission operation of the facsimile. Key 43 is for switching memory transmission to otherwise and vise versa, and LED 44 is used for the indication.

Key 45 is for conducting manual multi-address transmission, LED 46 indicates that manual multi-address transmission is going on or manual multi-address transmission can be conducted. The manual multi-address transmission will be described later.

Key 47 is for selecting reading processing of an intermediate mode, and LED 48 is used for indicating the state of selection.

Figure 3:
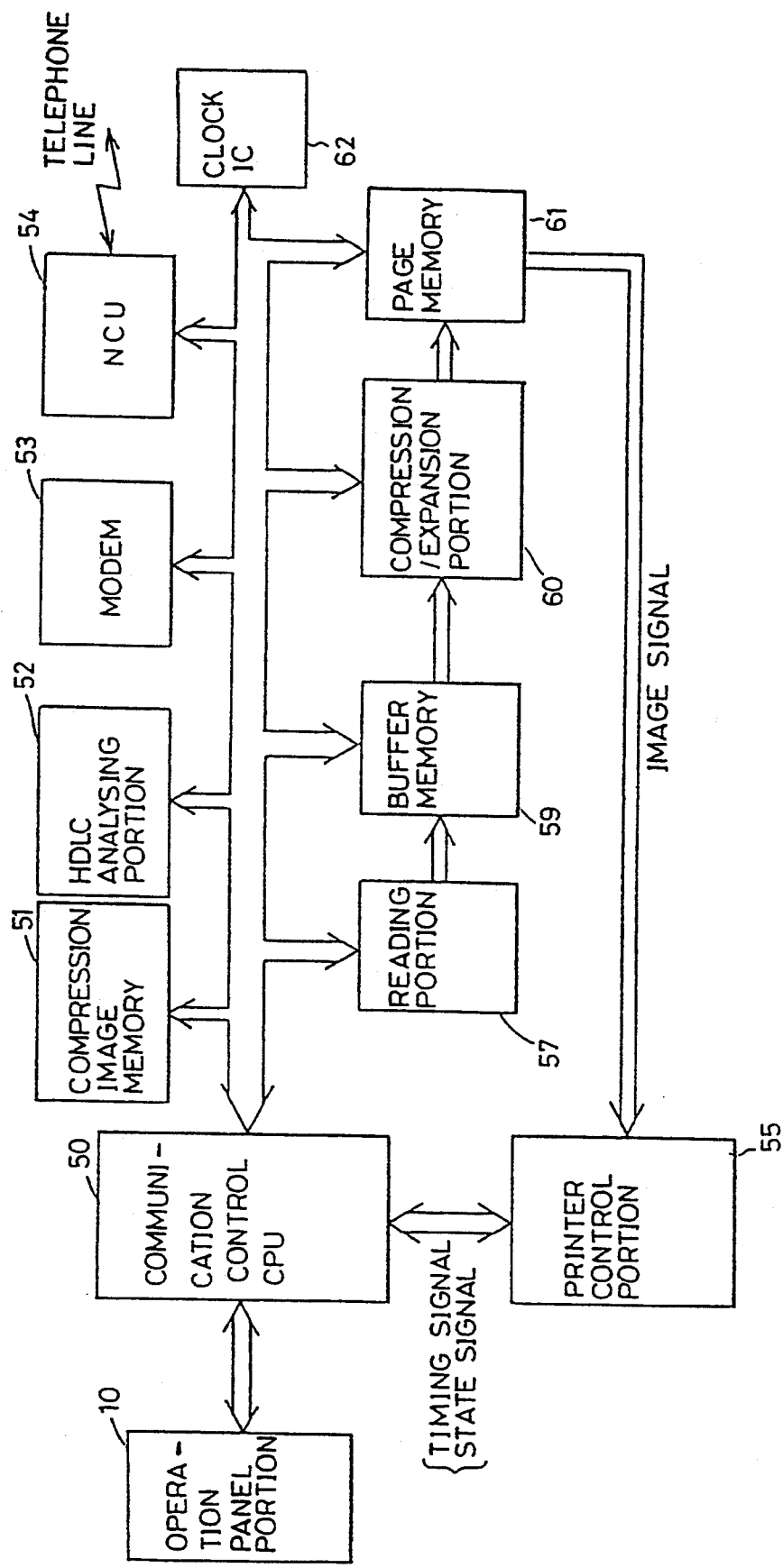
FIG. 3 a block diagram showing the control portion of a facsimile machine in accordance with the embodiment of the present invention.

FIG. 3 is a control block diagram showing a facsimile machine in accordance with one embodiment of the present invention.

The control portion is substantially formed of a communication control CPU 50, an operation panel 10, and a printer controller 55, and a communication path for transmitting mode information and a timing signal path connect these devices. The operations of these devices will be described in accordance with the operation of the facsimile machine.

The transmission operation will be described. The transmission operation includes (1) memory transmission, and (2) non-memory transmission, each of which will be described in the following.

(1) Transmission using a memory (hereinafter referred to as "memory transmission".)

An original is placed on original tray 20, the placement of the original is detected by the sensor 28 of reading portion 57, and the information is transmitted to CPU 50. CPU 50 causes a request of inputting an FAX number to be indicated on the display 41 of operation panel 10. In response to the input of the FAX number, an image signal for every 1 line is obtained conducting transportation of the original by a motor for driving in reading portion 57 simultaneously with reading operation by image sensor 28, and the 1 line data is transmitted to a buffer memory 59.

At that time, the image data in buffer memory 29 is compressed by a compression/expansion portion 60 to be stored in a compression image memory 51.

After completion of reading and storing operations, CPU 50 calls the facsimile device (FAX) on the receiving side through a telephone line via an NCU (Network Control Unit) 54. With the telephone line being connected thereto, the compressed data stored in compression image memory 51 is transmitted to compression/expansion portion 60 and is expanded, to be stored as actual image data in a page memory 61. Then, the data undergoes a processing for automatic reduction in accordance with the size of recording paper used on the receiving side FAX, and after being recompressed at compression/expansion portion 60 in accordance with the coding format of the receiving side FAX, the data is stored once again into another memory area of compression image memory 51 as compressed image data.

These expansion and compression operations are conducted alternately by one block unit of several lines.

Thus obtained compression data is processed in accordance with HDLC (High Level Data Link Control) specification by an HDLC analyzer 52, and transmitted to the telephone line by a modem 53 and NCU54. With all the image data having been transmitted, the device is disconnected from the telephone line in accordance with cutting procedure, thus completing the transmission operation.

(2) Transmission without a memory (hereinafter referred to as "non-memory transmission")

The operation as far as input of an FAX number after an original is placed on an original tray is the same as the above-stated memory transmission. Thereafter, dial input is conducted to the other party, and the image data is read, using the image sensor and motor of reading portion 57 after being connected to a telephone line, and the data is stored into buffer memory 59. At that time, the data is converted into compression data in accordance with the recording size and compression format of the other party, and the converted data is transmitted to the telephone line, using HDLC analyzer 52, modem 53 and NCU54 through compression image memory 51.

The basic operation at the time of reception is generally well known, and will therefore be only briefly touched upon.

Upon calling through a telephone line and establishment of line connection, incoming compression image data is expanded at compression/expansion portion 60 and is stored into page memory 61 as actual image data. At that time, the image signal is transmitted to a printer control portion 55, and recording is conducted in synchronization with mechanical control of the printer. The recording operation is completed by repeating this operation a necessary number of times.

Description will be provided on manual multi-address transmission.

Today, multi-address calling function or program transmission used generally in the field of facsimile machines is conducted by setting a plurality of destinations (dial numbers) in the first place, and by transmitting an original image to the plurality of destinations sequentially.

In contrast, according to manual multi-address transmission in accordance with the present invention, a dial number is reset with respect to an already transmitted original, and transmission can be made to the destination of the dial number without reading the original once again.

This produces the following advantages over general multi-address transmission devices.

1. Addition and change of destinations to which information is transmitted can be made easily.
2. The other party to which information is simultaneously transmitted does not have to be set in the first place, and, therefore, appropriate response can be made with respect to transmission mistakes, etc. from time to time.
3. The operation is easily handled because initial set-up is not necessary in the case of a single multi-address transmission.

As for usual transmission, if the same original is transmitted to two destinations, for example, reading of the original for the second time can be omitted, thereby advantageously alleviating labor by the operator.

Figure 4:
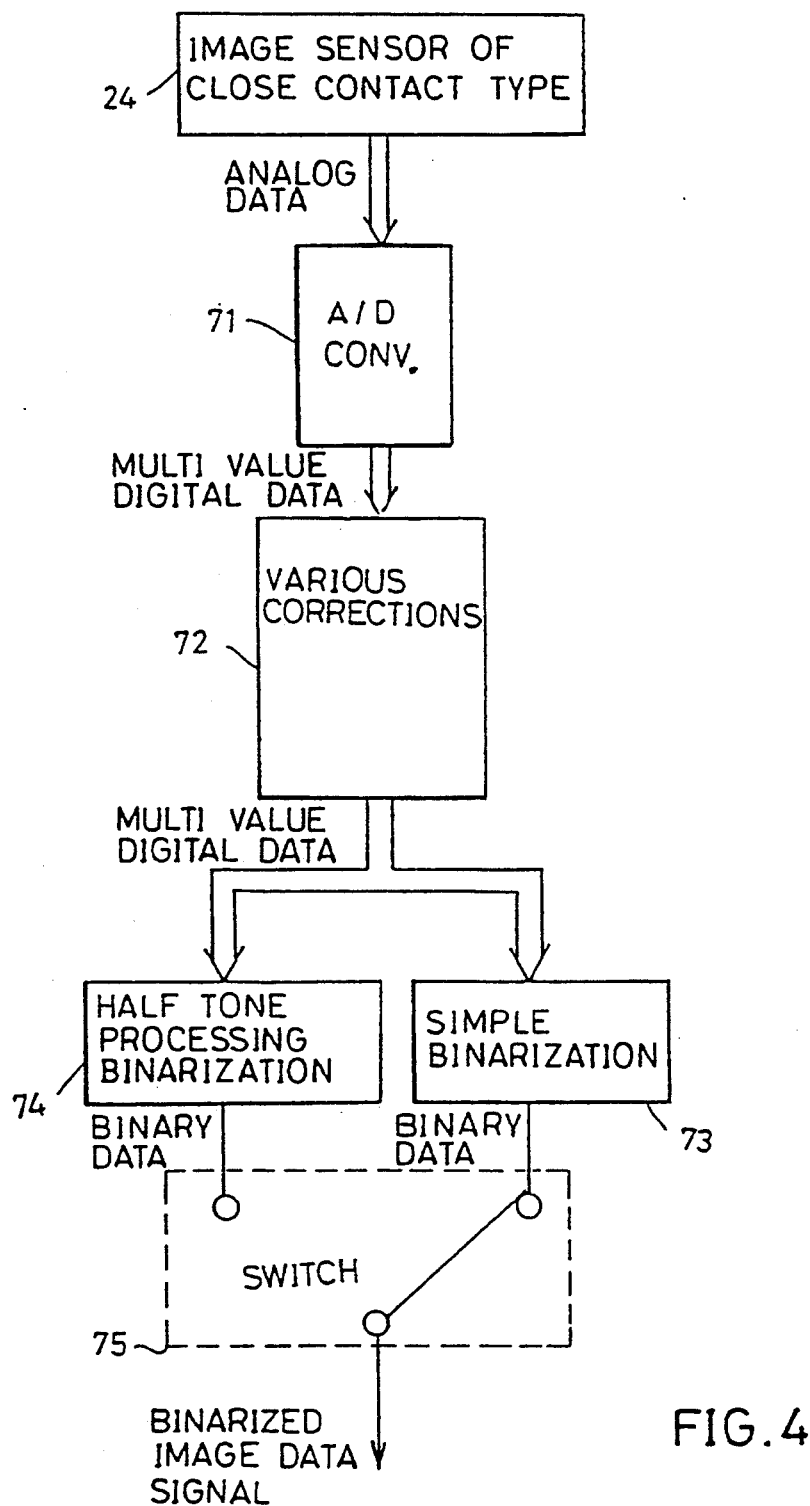
FIG. 4 is a block diagram showing a flow of binarization processing included in the reading portion shown in FIG. 3.

FIG. 4 is a block diagram showing the inside of reading portion 57, and showing a flow until an image analogue signal output from image sensor 24 is binarized and converted into a signal.

Analogue data, an output from close contact type image sensor 24 is converted into digital data of several bits by an A/D converter 71. Then, the digital data is subject to various corrections such as shading correction, r correction and filtering processing at a digital signal processing portion 72, and the output value is transmitted to binarizing processing portions 73 and 74.

Simple binarizing processing portion 74 conducts a simple binarization processing suitable for non-half tone image based on a threshold value, and half tone binarizing processing portion 74 deals with binarizing processing by dither processing. Hereinafter, the former processing mode is referred to as binary mode, and the latter processing mode is as half tone mode. As for processings conducted at intermediate binarizing processing portion 74, binarizing processing such as by means of error dispersion other than dither processing is possible.

A switch 75 is for selecting the output of either binarizing processing portions 73 or 74, the output of intermediate binarizing processing portion 74 is selected when the intermediate mode is selected, and the output of simple binarizing processing portion 73 is selected at the time of non-selection.

A digital image generally obtained by the intermediate binarizing processing by means of areal gradation tends to be inferior in the continuity of pixels as compared to an image obtained by simple binarization. Especially, in order to provide an image of color grey, the image is transformed into a dotted pattern, thereby providing an apparent image of grey. Therefore, when the digital image is compressed, the capacity of compression data is tremendously increased in the half tone mode as compared to the binary mode. This is because normal compression methods (MH, MR, MMR, etc.) are directed to a non-half tone image such as an original image of characters.

Although in this embodiment, the half tone image is transmitted after being subject to binarizing processing at half tone binarizing processing portion 74, multi-valued data output from digital signal processing portion 72 may be transmitted as it is, or transmitted after being subject to processing by multi-value dither method. In the above-described case, the amount of data is avoidably increased as compared to the case in which the simple binarizing processing is conducted.

Figure 6:
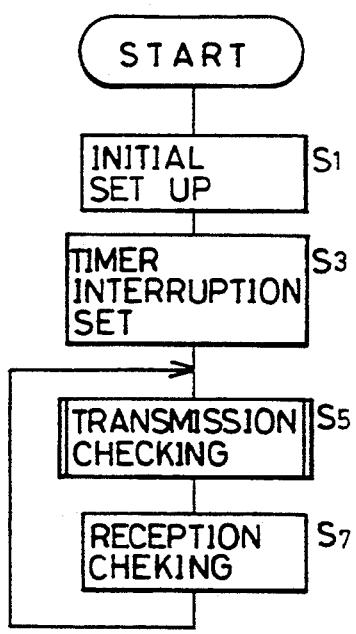
FIG. 6 is a flow chart showing the main routine of the communication control CPU 50 shown in FIG. 3.
Figure 7:
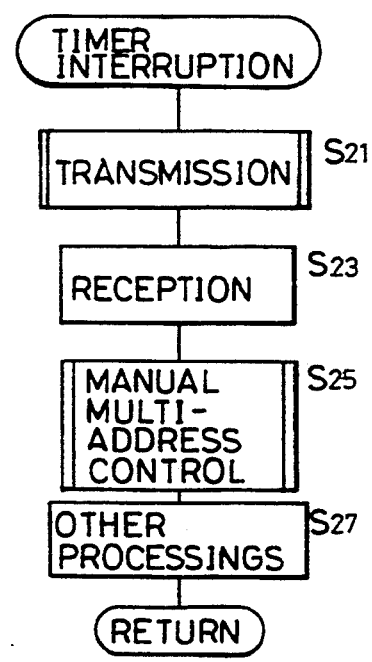
FIG. 7 is a flow chart showing the timer interruption routine in the communication control CPU 50 in FIG. 3.
Figure 8A:
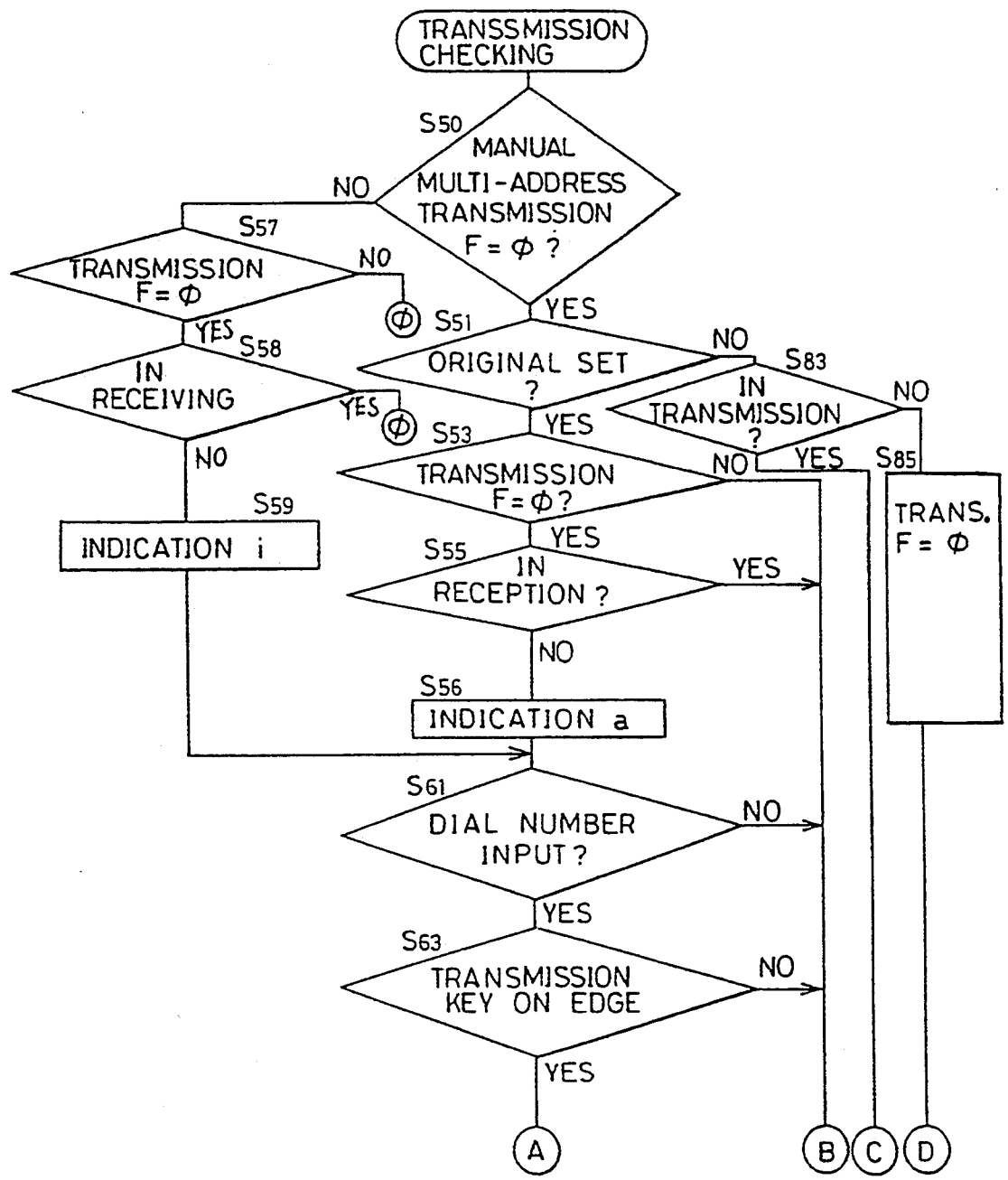
Figure 8B:
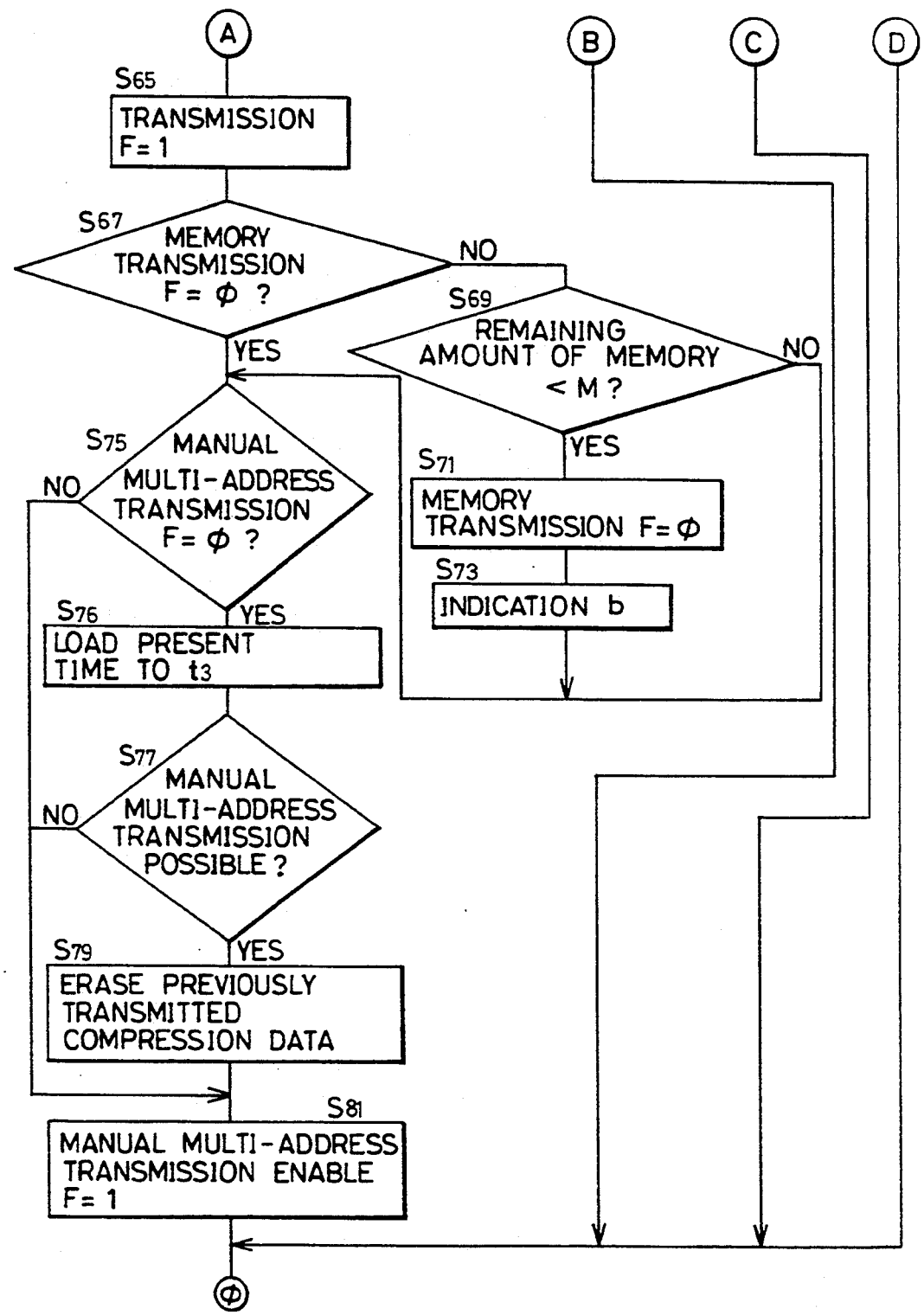
Figure 8D:
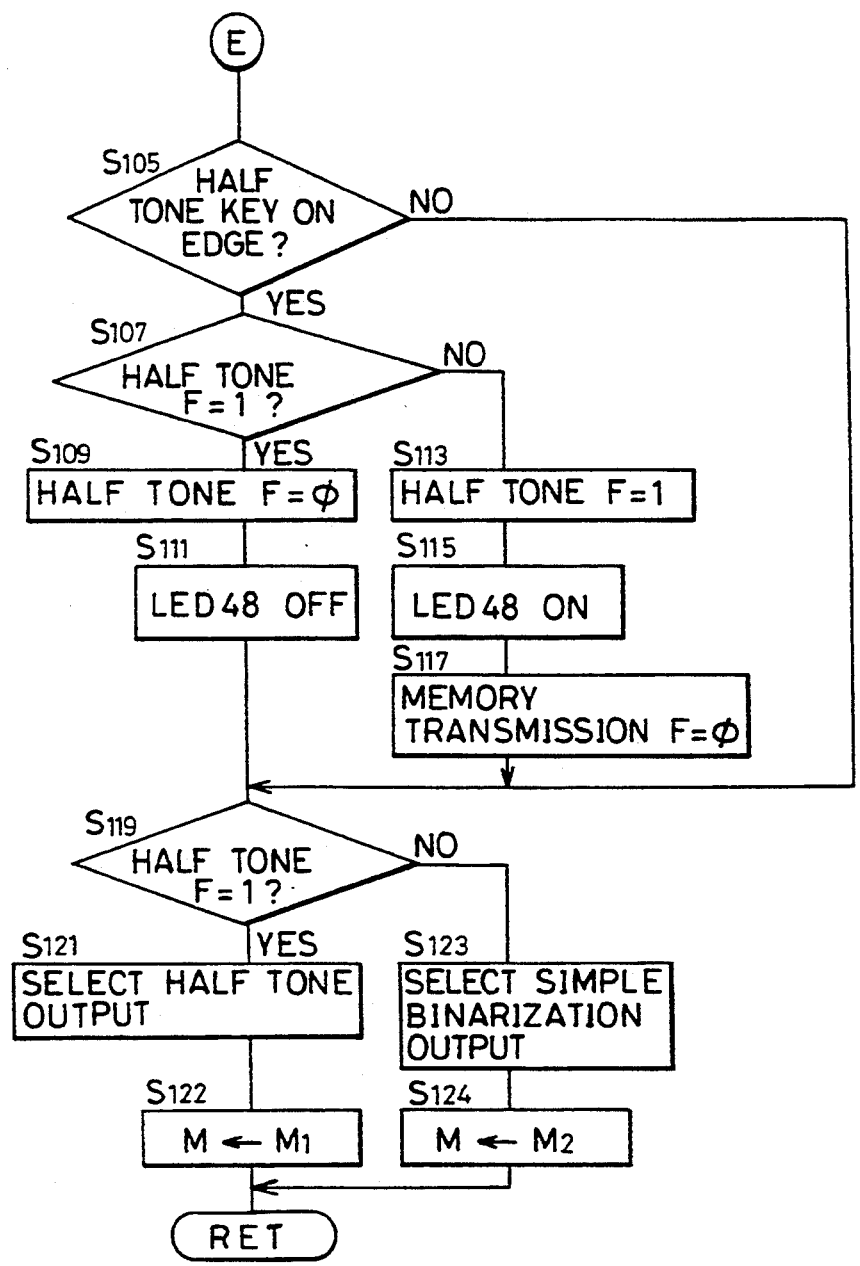

FIGS. 6 and 7 are control flows each schematically showing communication control CPU 50 in FIG. 3.

In step S1, a register, input/output ports, various flags, etc. are initialized. Next in step S3, timer interruption is set for periodically calling the interruption service routine shown in FIG. 7.

Steps S5 to S7 are various check routines for executing each sequence of the interruption service routine as desired, for example, for transmitting data upon demand for transmission. When all the processings up to step S7 are completed, the flow returns to step S5 and repeats the same checking procedure.

Transmission check routine S5 will be described in further detail later, but reception check routine S7 is not much relevant to the present invention and will not be described in detail.

FIG. 7 is the service routine for time interruption set in the flow of FIG. 6.

Figure 9A:
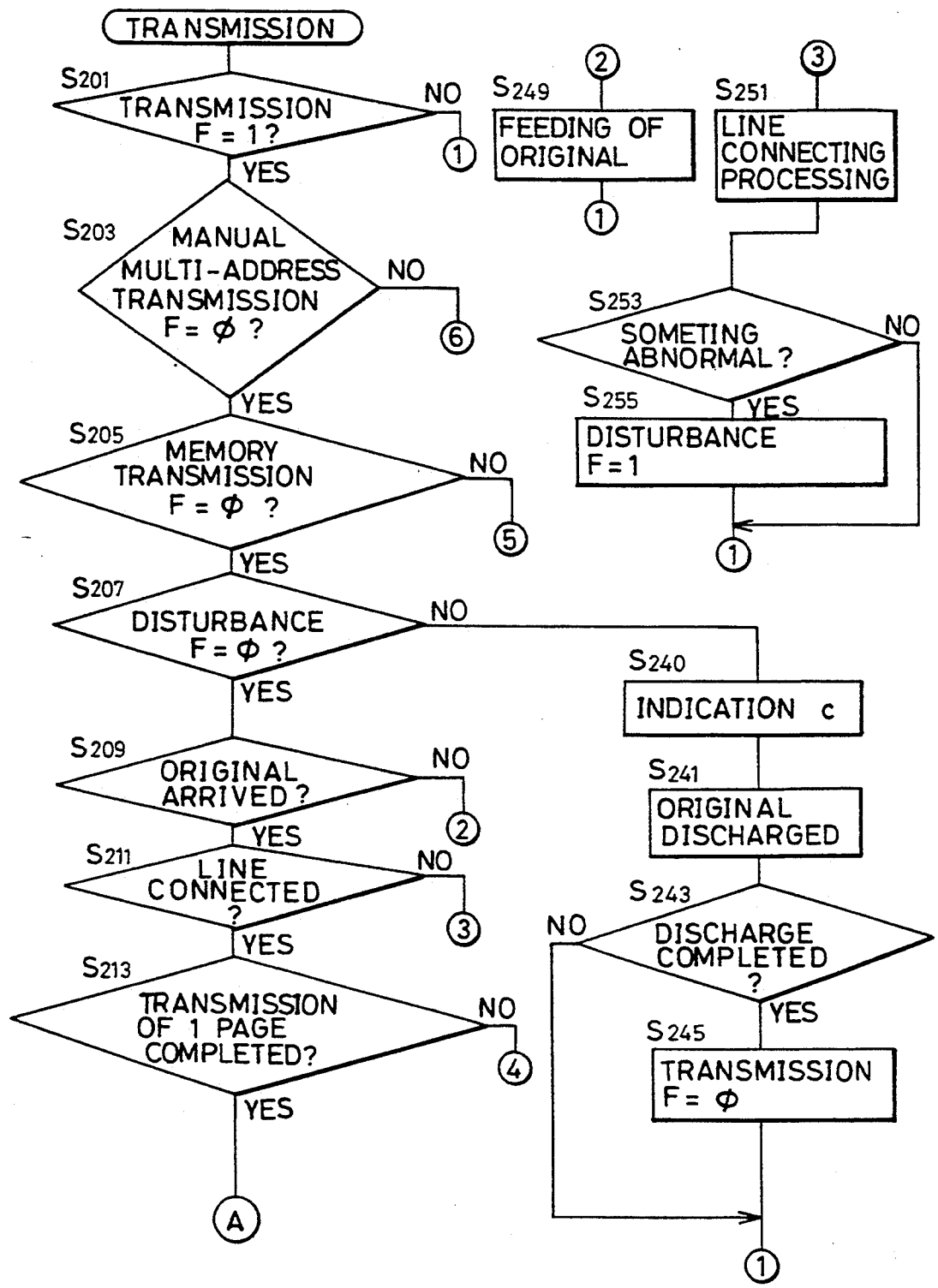

The service routine is formed of three sequences, transmission, reception and manual multi-address control, and detailed description will be provided on step S21 (transmission) and step S25 (manual multi-address control) in conjunction with FIG. 9A and others.

However, reception in step S23 is not much related to the present invention, and, therefore, detailed description will not be given on the step.

FIGS. 8A to 8D are flow charts specifically showing the contents of the transmission check routine of FIG. 6.

In step S50, determination is made as to whether or not transmission going on is multi-address calling. If it is multi-address calling (multi-address calling flag F=1), the processings subsequent to step S57 will be conducted.

Figure 5:
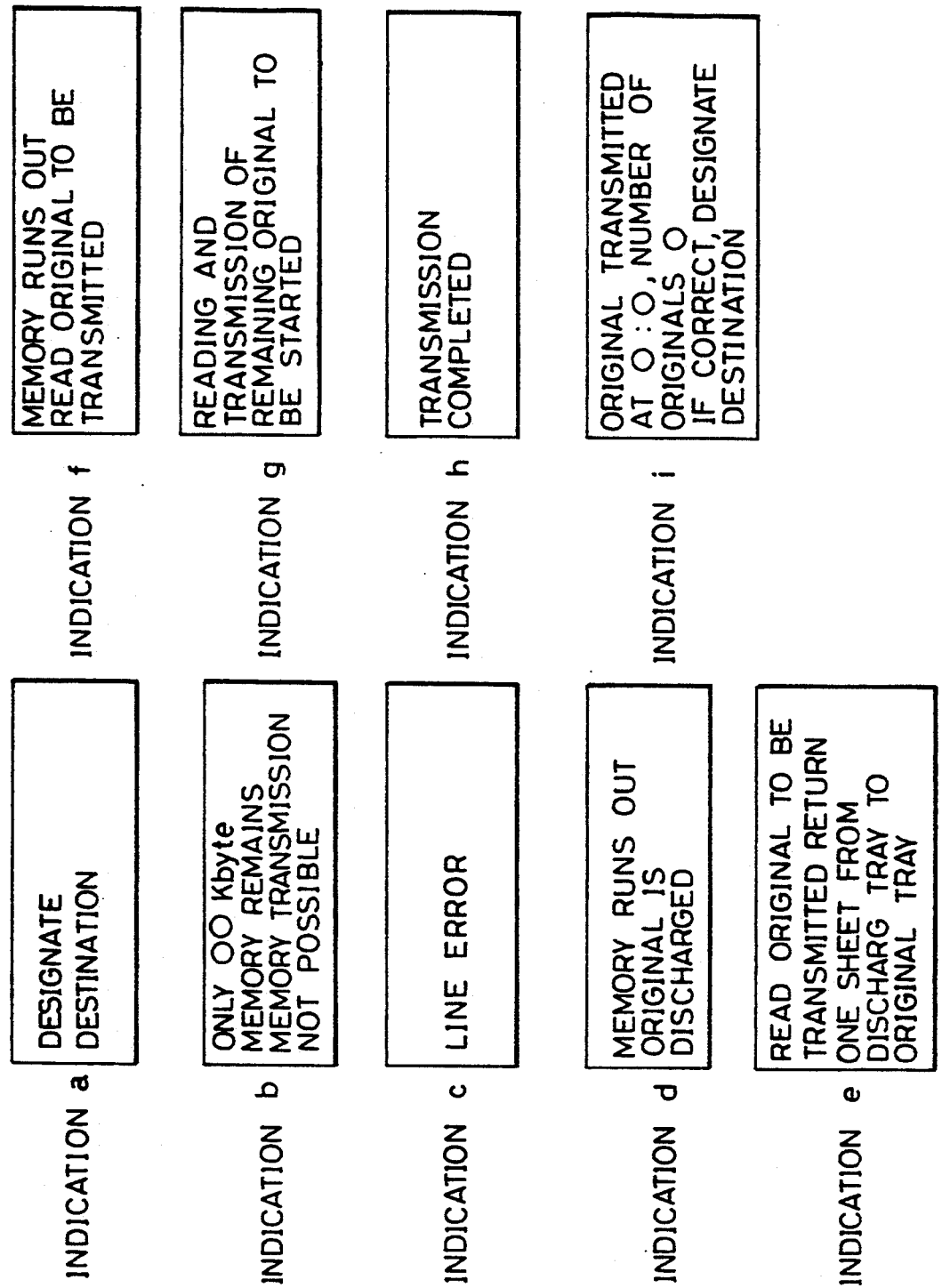
FIG. 5 is a diagram showing the contents displayed at the display portion of the operation panel shown in FIG. 2.

If transmission flag F=0 (YES in step S57), and reception is not going on (NO in step S58), indication i shown in FIG. 5 is displayed on liquid crystal panel 41, notifying the operator of time when image data already transmitted and stored in compression image memory 51 was originally transmitted and of the number of originals transmitted (step S59). The operator can determine the contents of the image data stored in compression image memory 51 by this indication, and can confirm whether or not the stored image data is the image data the operator desires to transmit. The time the image data stored in compression image memory 51 was originally transmitted is, as will be described later, stored in a storage area $t_3$ in the internal memory of communication control CPU 50. Also, the number of originals is stored in another memory area inside communication control CPU 50 when reading of the transmitted originals is completed. Although in the present embodiment, the time of original transmission of the image data and the number of originals are displayed as information for determining the contents of stored image data, the destination to which the image data was originally transmitted may be stored and displayed on liquid crystal panel 41. Furthermore, a part of the stored image data may be converted into dotted data, and may be displayed as it is on liquid crystal panel 41.

Furthermore, these kinds of information may be printed out on a sheet of paper by storage portion 1 in response to operation of a manual multi-address calling key.

In step 50, if transmission going on is not of multi-address calling, detection of the state of the original set is conducted in step S51. When the original is set, the flow proceeds to step subsequent to step S56, provided that the machine is not in the state of "transmission flag F=0" and "not receiving" (YES in step S53 and NO in step S55) in steps S53 and S55. "Transmission flag F=1" indicates that transmission is going on in a broad sense including feeding, reading, discharging of an original, etc. When an original is not set, determination is made as to whether or not transmission is going on in step S83. If not, with transmission flag being 0 in step S85, the flow proceeds to step S87 and onward.

Then, the operator is urged by indication a shown in FIG. 5 to input a dial number, and the flow proceeds to step S63 with input of the dial number (YES in S61). If an input to the transmission key is made in step S63, a processing for accepting the transmission mode is conducted in step S65 onward. More specifically, the transmission flag is set to 1 in step S65, and determination is made as to whether the transmission going on is of memory transmission in step S67.

If it is determined to be memory transmission, the remaining amount of memory is checked in step S69. If "the remaining amount of memory<M" (M is a constant amount) in other words the remaining amount of compression image memory is running short, memory transmission is canceled in step S71, and the operator is notified of that information in step S73. This is because the transmission is switched to the non-memory transmission which utilize only small amount of compression image memory 51, when the possibility of compression image memory 51 attaining the state of memory full in the middle of reading information is high (in other words "the remaining amount of memory<M") based on the estimation.

In this embodiment, the above-described processing is executed not only before starting reading operation but also during reading operation around the tails of pages of originals, which will be described later on.

In steps S75 to S81, memory is checked for manual multi-address calling.

Determination is made as to whether or not the previous transmission mode is manual multi-address calling. If not the present time is stored in a memory area $t_3$ in communication control CPU 50 in step S76. the compression data stored in compression image memory 51 which was transmitted at the time of the previous transmission is erased in step S79 provided that the transmission going on is "manual multi-address calling enable flag F=1" in step S77.

The erasure of the compression image data is not conducted right after the transmission, because it is necessary to prepare for transmission of the previously transmitted compression image data once again if manual multi-address calling is designated. In step S67, the compression image data previously transmitted is erased for the first time after the operator started transmitting another set of originals.

Multi-address calling enable flag F in step S77 is a flag for indicating whether or not manual multi-address calling is accepted, in other words whether image data which can be transmitted by manual multi-address calling is stored in compression image memory 51. It is necessary to hold previously transmitted image data for manual multi-address calling, but this results in the possibility of usable memory constantly being scarce. If the usable memory is limited, it will be disadvantageous at the time of reception. Therefore, in the present embodiment, memory is erased after the elapse of a constant time period after completion of reading of an original image or completion of its transmission, thereby preventing the usable memory from constantly being scarce.

The possibility that memory erasure after the elapse of a constant time period disables use of manual multi-address calling is substantially low because manual multi-address calling is usually conducted right after transmission.

In the above-described operation, as will be described later on, in step S77, erasure of memory is already made if "manual multi-address calling enable flag F=0", and, therefore, step S79 is omitted, because it is not necessary to erase memory once again.

In step S81, upon input of a new image, manual multi-address calling enable F is set to 1, thereby permitting acceptance of manual multi-address calling.

Steps S87 to 124 include sequences to deal with the keys of operation panel 10 in relation with transmission operation.

Switch-on or switch-off of LED 44 is inverted based on determination as to whether transmission going on is memory transmission in steps S89, S91, S93, S95 and S97, thereby indicating the state of transmission by LED, provided that memory transmission key 43 is pressed in step S87.

Then, if manual multi-address calling key 45 is pressed in step S99, the manual multi-address calling is accepted in step S103, provided that transmission is not going on in step S100, and manual multi-address calling is possible in step S101.

Provided that half-tone key 47 is pressed in S105, switch-on or switch-off of LED48 is inverted based on determination as to whether reading of the half-tone mode is going on in step S109, S111, S113, S115 and S117, thereby indicating the state by LED 48.

The contents of half tone flag F is checked in S119, the switch 75 of FIG. 4 is switched in steps S121 and 123 in accordance with the result, and a value M for checking the remaining amount of memory in step S69 as described above is written with $M_1$ or $M_2$ in steps S122 or S124.

Each of $M_1$ and $M_2$ is the amount of compression image data corresponding to a sheet of an original each in the cases of half-tone mode and binary mode. As described above, the amount of compression image data at the time of half-tone mode is large as compared to the data amount at the time of binary mode, as represented by $M_1 > M_2$.

In the embodiment, non-memory transmission is automatically set when setting of half-tone mode is conducted by the operation panel, and thereafter upon resetting of memory transmission, transmission of image data of half-tone mode by memory transmission is conducted. Additionally the value M for checking the remaining amount of memory is set to a large number at a time of half-tone mode.

Figure 9B:
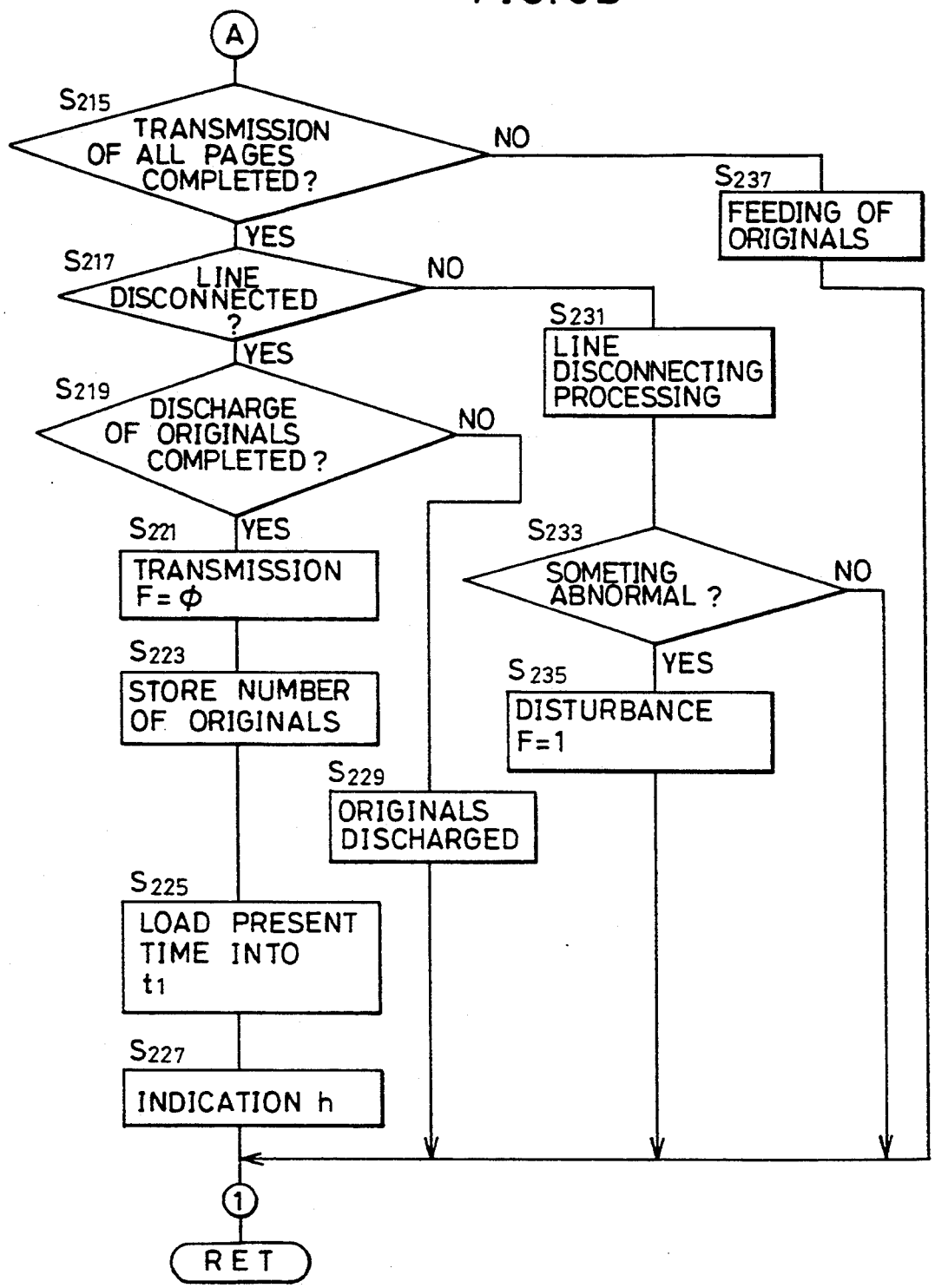
Figure 9C:
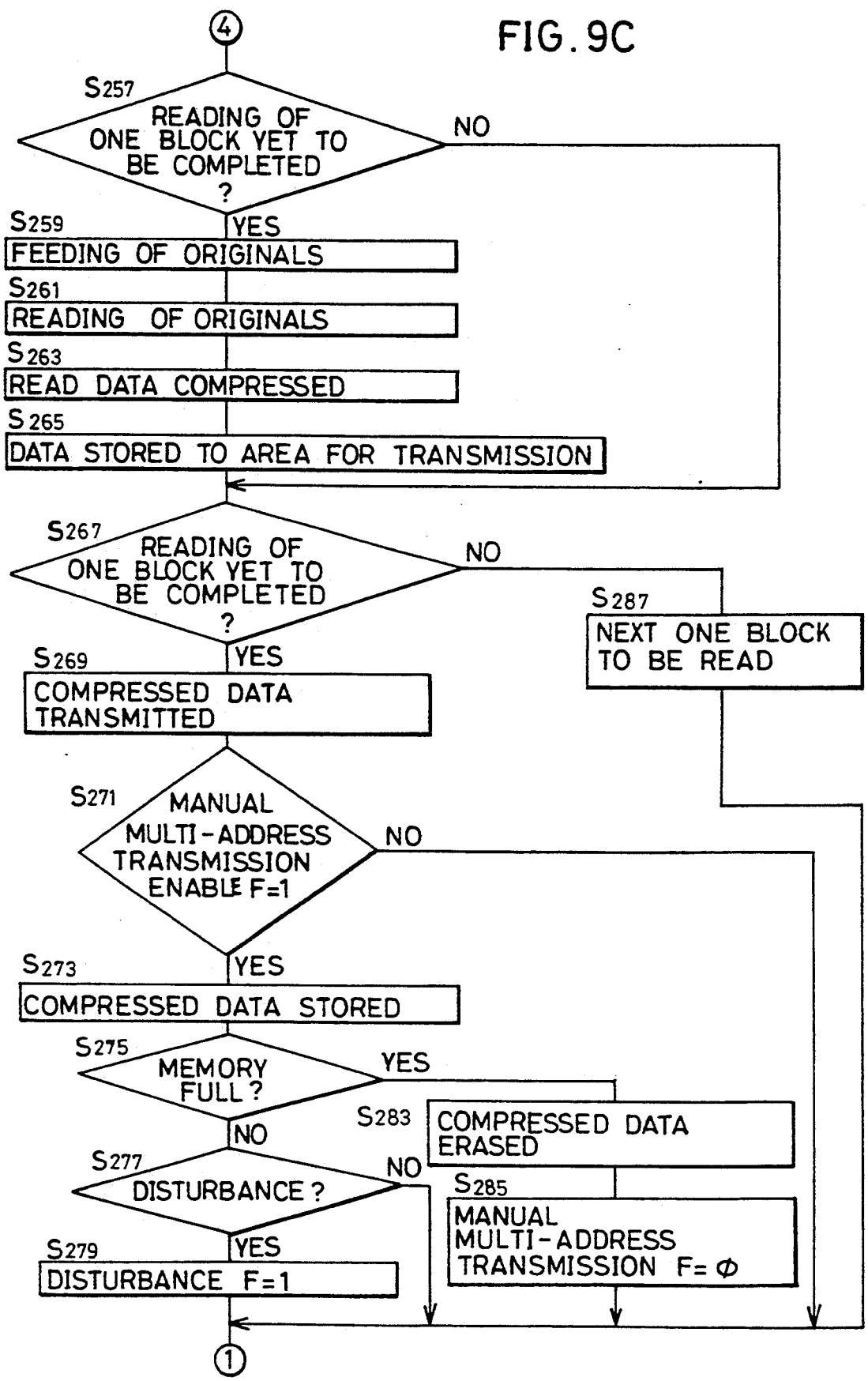
Figure 9D:
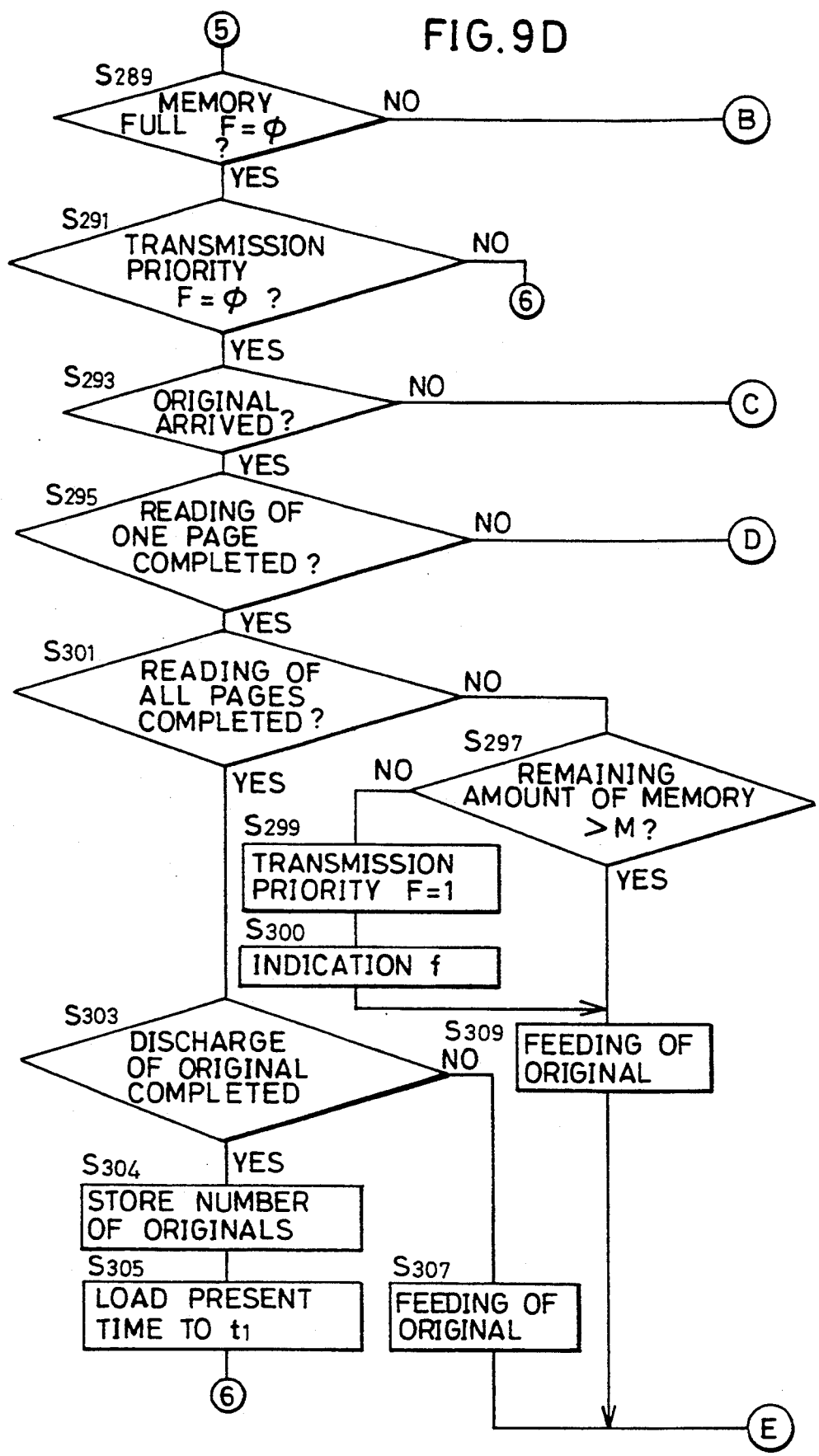

FIGS. 9A to 9F are flow charts each showing the specific contents of transmission processing in step S21. FIGS. 9A to 9C show processings at the time of non-memory transmission, while FIGS. 9D to 9F show processings at the time of memory transmission.

If transmission is going on in step S201 and manual multi-address processing is going on in step S203, the flow proceeds to step S341 onward, if the machine is in the state of memory transmission in step S205 the flow proceeds to step S289 onward, and if in the state of non-memory transmission the flow proceeds to step S207 onward.

Steps after step S207 are processings at the time of non-memory transmission, and the processing will be described.

The state of a disturbance flag F is checked in step S207. The disturbance flag is the flag set when troubles on the line caused by degradation in the state of the line, or defects on the receiving side, etc. If the line connection is cut off, the flow proceeds to step S240 onward, with the indication b of FIG. 5 showing the information, the original undergoing reading is discharged to discharge tray 29 in step S241, and the transmission flag F is set to zero upon completion of the discharge in step S243 (S245), thereby stopping the transmission operation.

In steps S209 to 219, it is checked which transmission operation is going on, and the flow branches into steps each in compliance with various modes of operation.

Feeding of an original is conducted in step S249 until a preceding original to be read out reaches image sensor 24 in step S209.

Line connecting processing is performed in step S251 until the line connection is completed in step S211. If some abnormal situation takes place in the line connection in step S253, the disturbance flag F is set to 1 in step S255, thereby proceeding to the above-described stopping processing.

In step S213 onward, the flow proceeds to reading processing of the originals, the processing goes on in step S257 onward until transmission of one page is completed in step S213. Steps after step S257 will be described later on.

If transmission of the previous page is not completed in step S215, transmission of the next original is performed in step S237, while once transmission is completed, the flow proceeds to step S217, thereby starting line disconnecting processing.

Line disconnecting processing is conducted in step S231 until it is determined that disconnecting of the line is completed in step S217. If it is determined that some abnormal situation takes place in the disconnecting processing in step S233, the disturbance flag F is set, thereby proceeding to stopping operation.

Finally, discharging of the originals onto discharge tray 29 continues in step S229, until it is determined that the discharging of the originals is completed in step S219.

The transmission flag F is reset in step S221, and the number of the originals is stored in a prescribed storage area of the internal memory of communication control CPU 50. The number of the originals is detected by counting the number of times an original is fed to image sensor 24 in steps S249 and S237. The present time based on the time indicated in clock IC62 is stored in a storage area $t_1$ of the internal memory of communication control CPU 50 in step S225, and after the indication h of FIG. 5 is made, the flow returns.

The storage of the present time into storage area $t_1$ in step S225 is for erasing image data stored for the above-described manual multi-address calling by the elapse of a prescribed time period, and indicates setting of time to start counting the elapse of time.

Steps S257 to S287 are a flow executing reading and transmission processings of an original of 1 page.

These operations are executed by 1 block unit formed of several lines in the present embodiment, reading and transmission of 1 block are started simultaneously, the reading operation is completed before the transmission operation due to the difference in the line speeds, and, therefore, the reading system waits at the end of each block.

In step S257, determination is made as to whether or not reading of one block is completed, and reading operation is conducted from step S259 to S265 until the reading of 1 block is completed. In other words, feeding of the original in step S259, reading of the original in step S261, compression of the read data in step S263, and storing of the compressed data to a transmission area (which corresponds to a part of compression image memory 51 in the present embodiment) in step S265 are conducted.

Then, in step S267, determination is made as to whether or not transmission of 1 block is completed, and transmission of the image data to the line is conducted through steps S269 to S285 until transmission of data for 1 block to the line is completed. More specifically, in step S269, transmission of the compressed data is conducted, and if it is determined that manual multi-address calling is possible in step S271, compressed data is sequentially stored into compression image memory 51 in step S273, thereby preparing for upcoming manual multi-address calling operation.

Steps S275, S283 and S285 are measures taken against memory overflow in the process of memory storage for manual multi-address calling at the time of non-memory transmission.

Even with the occurrence of such an overflow situation, only manual multi-address calling is disabled, and it is therefore not necessary to stop transmission operation itself. If it is determined that such a memory over situation takes place in step S275, the flow proceeds to step S283 onward, erasing the compressed data and resetting the manual multi-address enable flag F. Furthermore, the operator is notified of the fact that manual multi-address calling is not possible, and this notification is made as a part of manual multi-address control in step S25, on which description will be provided later on.

In step S277, detection is made as to whether the occurence of stop of the transmission operation, and if stopping takes place, the disturbance flag F is set to 1 in step S279, notifying the operator of the line error using the indication c of FIG. 5.

Steps S289 to S369 are processings at the time of memory-transmission. Before getting into description of the processings, measures taken upon the occurence of the memory full situation at the time of reading operation for memory-transmission will be described.

Image data read at the time of memory-transmission is all compressed and stored in compression image memory 51, but the amount of compressed data varies tremendously depending upon the number of originals, the fineness of original images, and whether or not reading is conducted at half tone mode, and the data sometimes cannot be entirely stored in compression image memory 51. Therefore, the processing represented by (1) to (3) are taken.

(1) The remaining amount of memory is checked before starting reading as described above, and if the remaining amount is smaller than a constant amount M, the operation is switched to non-memory transmission.

(2) Similar checking to 1 is conducted for every page read, and if "the remaining amount of memory<M" holds, the read data is transmitted first, and reading and transmission operations of the remaining originals are conducted thereafter.

(3) Upon the occurence of a memory over situation in the middle of reading, the original undergoing reading is discharged, the already read originals are transmitted first while urging the operator to return the original to original tray 20, and reading and transmission operations of the remaining originals are conducted thereafter. Time required for the operator to return the original to original tray 20 upon the occurence of the memory over situation is sufficiently short as compared to time required for transmitting the read originals. The transmission operation as a whole can be conducted smoothly with this returning operation in between.

Now, description will be provided on the flow.

The memory full flag F and transmission priority flag F are checked in steps S289 and S291. The memory full flag F is a flag set upon the occurence of a memory full situation (which includes the case of "the remaining amount of memory<M", strictly speaking) and the transmission priority flag F is a flag set when transmission is conducted first upon the memory full situation.

If these flags are not set to 1, the flow proceeds to step S293 onward, checking is made as to which transmission operation is going on at present in steps S293, S295, S301, S303, S341, S343 and S345, and the flow branches depending upon each transmission operation.

Feeding of the originals is executed in step S331 until the original of the first page reaches the reading position of image sensor 24 in step S293.

Then, reading of the original is executed from step S311 onward until reading of the original of one page is completed in step S295. More specifically, original image data is obtained reading the original by image sensor 24 of close contacting type in step S313 simultaneously with feeding of the original in step S311, the image data is compressed in compression/expansion potion 60 in step S315 and is then stored in compression image memory 51 in step S313. If it is determined in step S319 that compression image memory 51 is filled and reading of that 1 page is not yet completed (YES in S320), the flow proceeds to step S321 onward. Processings from step S321 onward are conducted under the condition that reading of that 1 page is completed, because memory transmission of the original of the page is possible if reading of that one page is completed even in the memory full situation.

The memory full flag F is set to 1 in step S321, and manual multi-address calling enable flag F is set to 0 in step S323. This is because compressed image data of the original of that one page cannot entirely be stored in the memory at a time under the memory full condition, and manual multi-address calling operation is not possible.

Then, the compressed image data in the middle of reading is erased in step S325, and the operator is informed of the occurence of memory full situation by the indication d of FIG. 5.

If reading of the original of one page is completed in step S295 and reading of the previous stage is not completed in step S301, it is determined whether the remaining amount of memory is larger than a constant amount M or not in step S297. Whether or not reading of the next original is possible without the occurence of memory full situation can be estimated by this operation. If "the remaining amount of memory$\leq$M" holds, the transmission priority flag F is set to 1 in step S299, feeding of the next original is conducted, giving the indication f of FIG. 5 in step S300 (S309). If reading of all the pages is completed, the flow proceeds to step S303, and discharging operation is conducted in step S307 until discharge of the final original to discharge tray 29 is completed. After the completion of discharge, the number of originals read is stored, and the present time is stored in storage area $t_1$ in step S305. This time is used as a reference for the elapse of time used for erasing the memory of manual multi-address calling.

The flow proceeds to transmission operation to the line from step S341 onward.

Line connecting processing is executed in step S369 until line connecting is completed in step S341, and when the connection is completed, transmission operation of data is conducted in step S367 until transmission of all the image data is completed.

With transmission of the image data being completed, the memory transmission flag is set to 0 in step S359 when the transmission priority flag F is 1 in step S345, switching to non-memory transmission.

This is because if the remaining originals are transmitted by means of memory transmission, there is high possibility of having a memory full situation, and it is not desirable to frequently stop transmission of a part of the originals due to the memory full situation.

Then, the transmission priority flag F is reset to 0 in step S361, informing the operator by the indication g of FIG. 5 of that reading and transmission of the remaining originals are conducted. Then, disconnecting processing of the line is started, and the disconnecting processing continues in step S365 until disconnecting of the line is completed in step S347.

Now, description will be provided on the case in which the memory full situation takes place at the time of storing the compressed data in step S317.

In this case, the flow proceeds from step S289 to step S333, and the original being read is discharged to discharge tray 29 until the discharge is completed in step S344. Upon completion of the discharge of the original, the memory full flag F is returned to 0 in step S335, and the operator is notified by the indication e of FIG. 5 that the original image previously read is transmitted. Furthermore, the indication requests the operator to return one sheet of the originals (the original which caused the memory full situation) on the discharge tray to the original tray. The transmission priority flag F is set to 1 in step S339.

After the transmission priority flag F is set to 1, the flow proceeds from step S291 to step S341 onward, getting into transmission of data to the line. When the transmission of data to the line is completed, the flow proceeds from step S347 to step S365, executing disconnecting processing of the line.

Steps S345 to S357 represent processings in the case the transmission is completed without the occurence of a memory full situation.

The transmission flag F is set to 0 in step S349, the flow proceeds from step S351 to step S353 only if the next transmission is manual multi-address calling, setting the manual multi-address calling flag F to 0. Then, the operator is notified of the completion of the transmission by the indication h of FIG. 5 in step S357, thereby completing the transmission operation.

Figure 10:
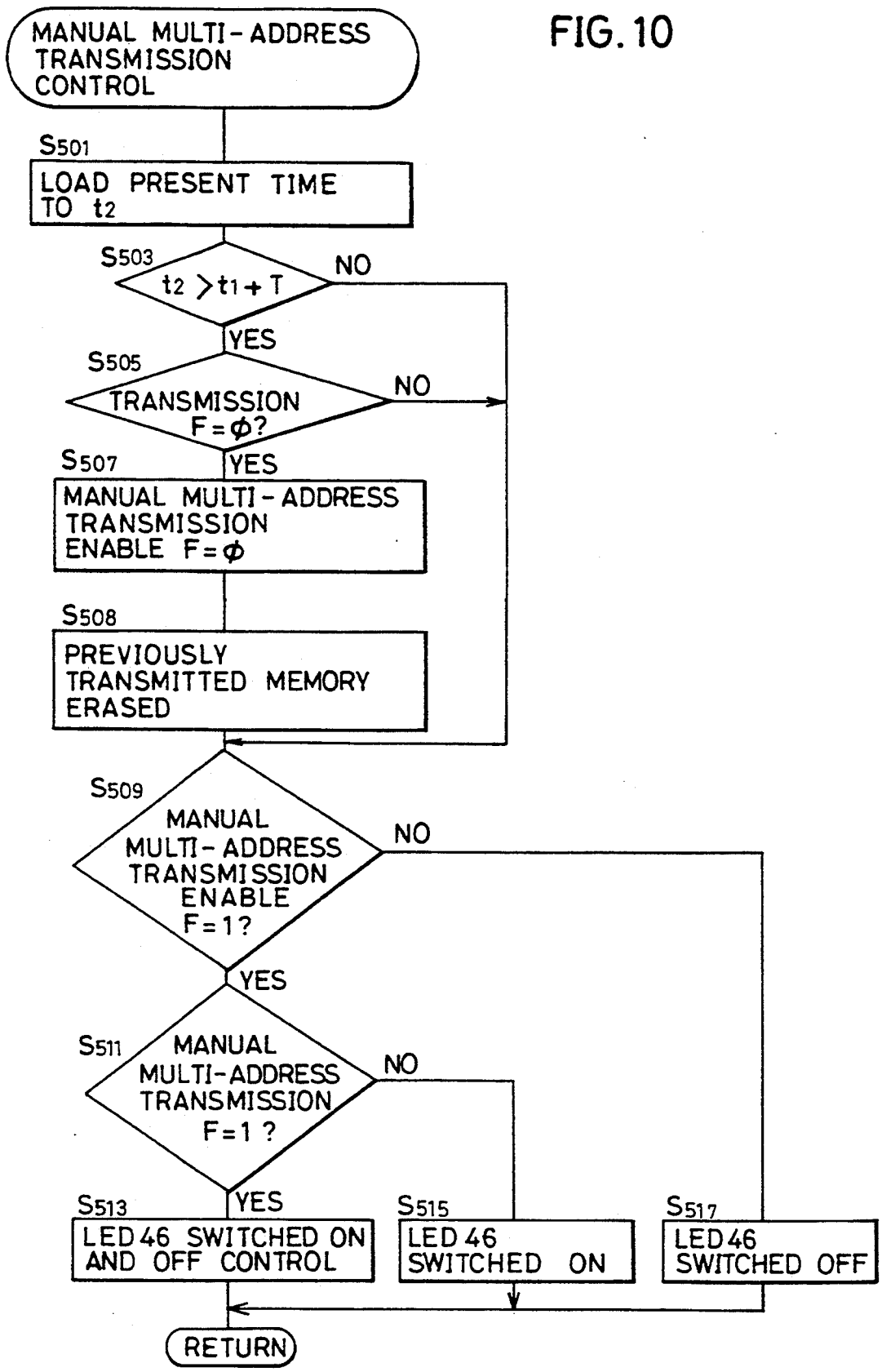
FIG. 10 is a flow chart showing the specific contents of the manual multi-address control routine shown in FIG. 7.

FIG. 10 is a flow chart showing the specific contents of manual multi-address calling control in which the data of image memory for manual multi-address calling is erased after the elapse of a prescribed time period from the previous transmission.

Time counting for this erasure operation is started at the following timings.

(1) When transmission is completed in the case in which the previous transmission is non-memory transmission (line disconnecting).

(2) When reading of originals is completed in the case in which the previous transmission is memory transmission.

(3) When transmission is completed in the case in which the previous transmission is manual multi-address calling (line disconnecting).

The counting time start time has been already stored in the storage area t1 in the above-described flow. The present time is stored in storage area $t_2$ in step S501. In step S503, if time stored in storage area $t_2$ is T time period or longer elapsed from the time stored in storage area $t_1$, and the machine is not in the state of transmission in step S505, the manual multi-address calling enable flag F is set to 0 in step S507, disabling acceptance of manual-address calling, and the data of memory previously transmitted is erased in step S508.

Although the value T is set to time around when the operator has conducted operations associated with transmission, leave from the facsimile machine, and manual-address calling will not be conducted any longer, the other factors may be taken into account.

However, it is desirable that the operator can determine if erasure of memory due to the time set as described above of inhibition of acceptance of manual multi-address calling due to the situation of the above-described memory full are conducted.

LED 46 is therefore used for the following purposes, giving the operator information associated with manual-address calling.

(1) LED 46 is switched on and off during manual multi-address calling is going on.

(2) LED 46 is switched on if manual multi-address calling is possible.

(3) LED 46 is switched off if manual multi-address calling is not possible.

A flow executing the above-described processings from step S509 onward will be described.

If it is determined that manual multi-address calling is not possible in step S509, LED 46 is turned off in step S517. Furthermore, if manual multi-address calling is possible and it is determined in step S511 that the device is not presently executing manual multi-address calling, LED 46 is switched on in step S515. Then, if it is determined in step S511 that manual multi-address calling is going on, LED 46 is switched on and off in step S513.

In the above-described embodiment, a method of switching from memory transmission to non-memory transmission as retrieving operation has been described when the remaining amount of memory is scarce, two other embodiments are possible and description will be provided on these embodiments.

Figure 11:
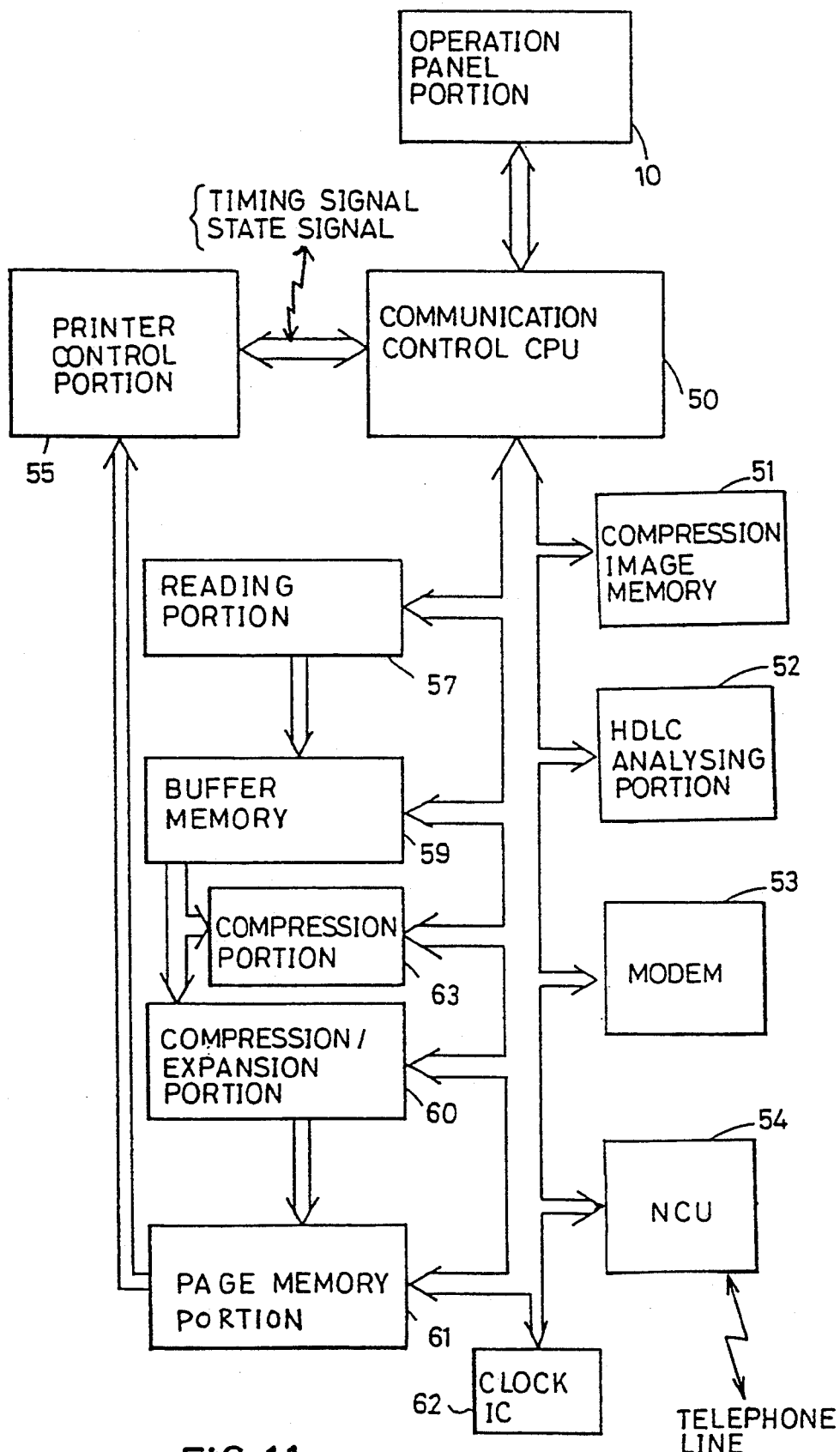
FIG. 11 is a block diagram showing the control portion of a facsimile machine in accordance with another embodiment of the present invention.

A First Embodiment for Coping With the Scarcity of the Remaining Memory During Memory Transmission A facsimile machine, which is structured by a block diagram in FIG. 11 in place of the block diagram of FIG. 3 is to be considered. The facsimile machine is different from the machine shown in FIG. 3 in provision of another compression portion 63 having a compression function other than compression/expansion portion 60. Compression portion 63 is used to compress image data read by reading portion 57 while compression/expansion portion 60 is used for expansion→recompression operation at the time of memory transmission. In other words, at the time of memory transmission, transmission operation (strictly speaking transmission to the line) and reading operation of an image can be performed in parallel.

Figure 13:
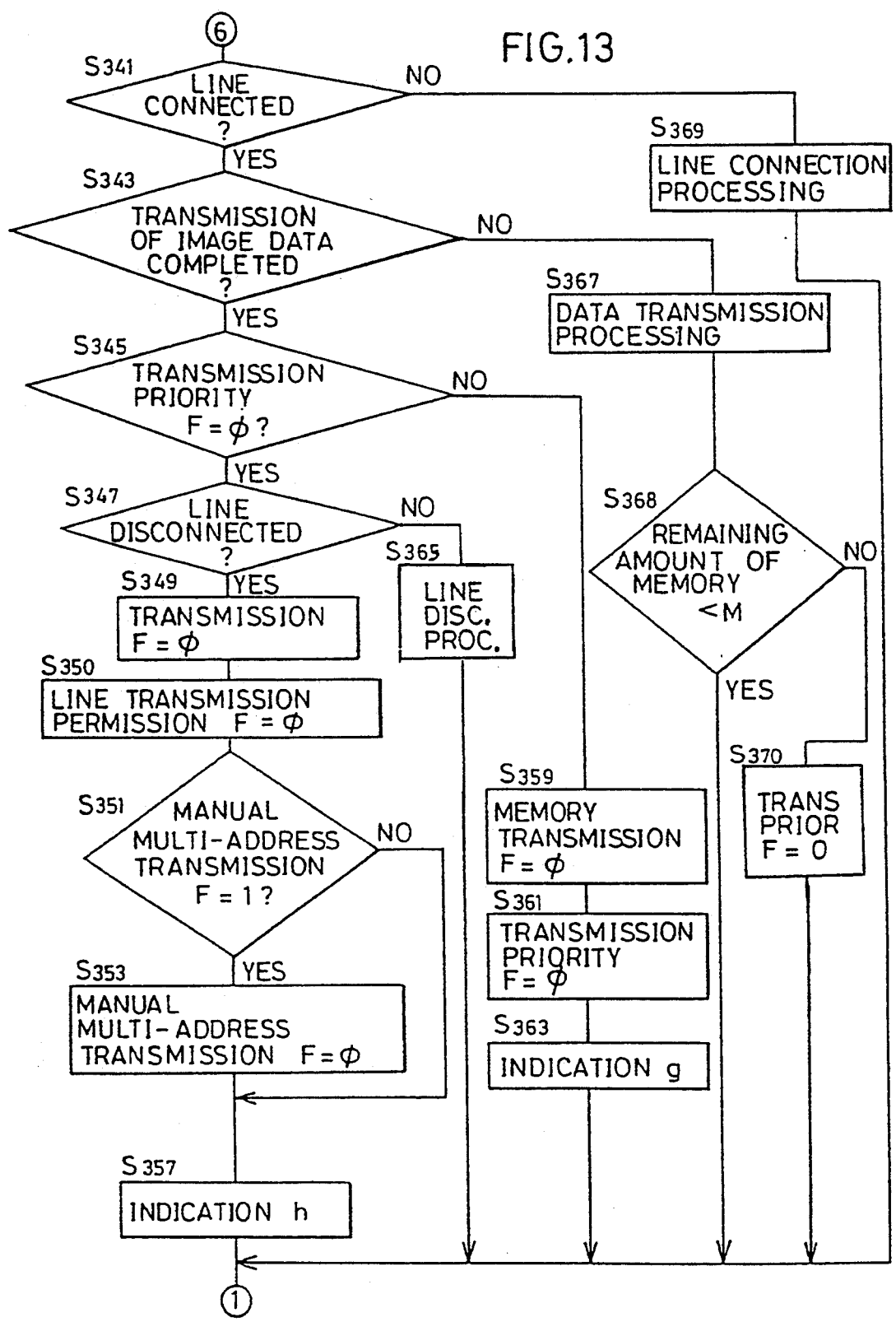
FIG. 13 is a flow chart showing the embodiment shown in FIG. 11, corresponding to FIG. 9F showing the former embodiment.

Thus, reading of the originals which have not yet been read can be resumed without waiting for completion of transmission operation of the already read image due to the lack of the remaining memory amount or the memory for situation. Furthermore, switching from memory transmission to non-memory transmission which was necessary will not be required. More specifically, transmission of image data to the line proceeds, and when the vacant space of compression image memory 51 is enough reading of the original is resumed. This embodiment is implemented by flow charts shown in FIGS. 12A, 12B and 13 in place of FIGS. 9D, 9E and 9F. A major difference from FIGS. 9D, 9E and 9F is provision of a line transmission permission flag F as shown in steps S306, S330, and S350, and that reading and transmission to the line are permitted simultaneously at the time of memory transmission. If of course the remaining amount of memory is not scarce, this simultaneous operations of transmission and reading will not be performed depending upon the determination made in step S330. Another difference is provision of steps S368 and S370, whereby the remaining amount of memory is checked at the time of data transmission to the line, and if the remaining amount is enough the transmission priority mode is canceled in step S370. Thereafter reading and transmission to the line are simultaneously conducted due to this processing.

A Second Embodiment for Coping With the Lack of the Remaining Amount of Memory During Memory Transmission In a facsimile machine structured as shown in the block of FIG. 3, the memory transmission mode may be maintained as is the case with the previous first embodiment even if the memory full situation takes place.

In this case, once transmission of read image data is completed, disconnecting of the line will be necessary. Memory transmission of the remaining originals is conducted some time later. As described above, all the originals are transmitted by means of memory transmission, and, therefore, in the transmission of the remaining originals, the operator can take home with him/her the already read originals. The operator can therefore be advantageously released from the facsimile machine sooner.

In the former embodiment, erasure of data in the memory is conducted after the elapse of a constant time period for the purpose of increasing the capacity of the memory at the time of manual multi-address calling. However, the real advantage of this erasure operation of the memory is demonstrated in reception operation in the facsimile machine. This is because in usual transmission operation, data on a memory for manual multi-address calling has been already erased prior to reading of a new original.

Two kinds of approaches for increasing the capacity of the memory just for transmission operation will be described.

A First Embodiment Related to Data Erasure

Figure 14:
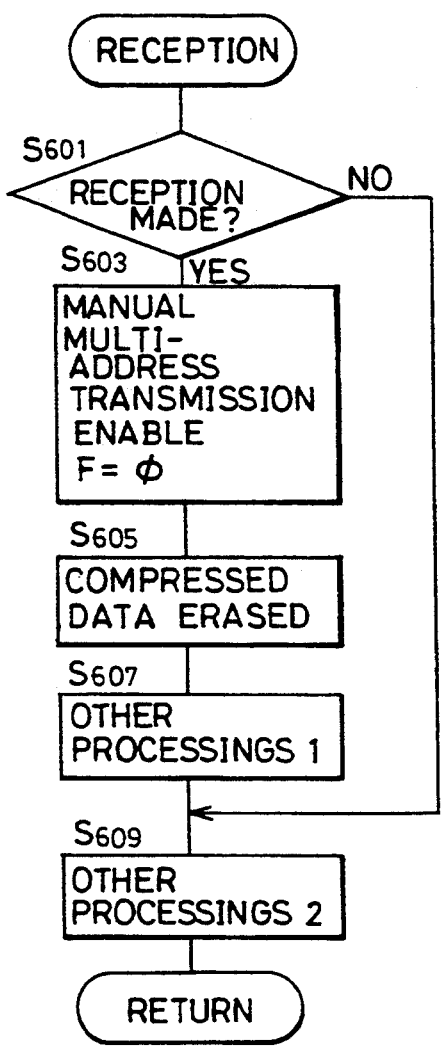
FIG. 14 is a flow chart showing the specific contents of a transmission routine in accordance with yet another embodiment of the present invention.

Upon reception, data on a memory for manual-address calling is erased for the first time. In other words, as shown in FIG. 14, when reception is made in step S601, data on the memory for manual multi-address calling is erased by executing the processings in steps S603 and S605, thereby emptying the memory for storage of received image data.

A Second Embodiment Related to Data Erasure

Figure 15:
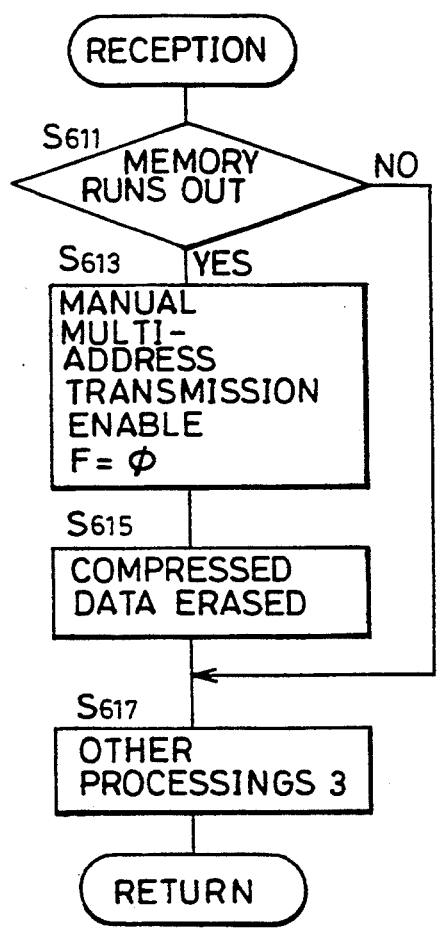
FIG. 15 is a flow chart showing the specific contents of a transmission routine in accordance with a still further embodiment of the present invention.

Erasure is performed when the memory remaining amount runs out due to reception. In other words as shown in FIG. 15, the remaining amount of memory is monitored in step S611, and data on a memory for manual multi-address calling is erased by executing processings in steps S613 and S615 when the remaining amount of memory becomes scarce, thereby emptying the memory for storage of reception image data.

Although the present invention has been described and illustrated in detail, it is clearly understood that the same is by way of illustration and example only and is not to be taken by way of limitation, the spirit and scope of the present invention being limited only by the terms of the appended claims.

what is claimed is:

1. A facsimile machine comprising:
    reading means for reading out image information of an original image to be transmitted:
    transmission means for transmitting the image information read by said reading means to an external device;
    storage means for storing said read image information in parallel with a transmission operation by said transmission means;
    operation means for instructing retransmission of the image information stored in said storage means;
    control means for controlling said transmission means to transmit once again the image information stored in said storage means in response to operation of said operation means;
    timer means for detecting an elapse of a prescribed time period from completion of the transmission operation of said transmission means; and
    erasure means responsive to a detection output of said timer means for erasing the image information stored in said storage means.

2. A facsimile machine as recited in claim 1 further comprising:
    indication means for indicating that the image information is erased by said erasure means.

3. A facsimile machine as recited in claim 2, further comprising:
    inhibition means for inhibiting control by said control means when the image information is erased by said erasure means.

4. A facsimile machine, comprising:
    reading means for reading out first image information of an original image to be transmitted;
    transmission means for transmitting the image information read by said reading means to an external device;
    storage means for storing said read image information in parallel with a transmission operation by said transmission means;
    operation means for instructing retransmission of the image information stored in said storage means;
    control means for controlling said transmission means to transmit once again the image information stored in said storage means in response to an operation of said operation means;
    reception means for receiving image information,
    said storage means erasing said stored image information and storing the image information received by said reception means when reception by said reception means is conducted; and
    printing means for printing out said received image information stored in said storage means.

5. A facsimile machine as recited in claim 4, further comprising:
    indication means for indicating information to determine the contents of said stored image information.

6. A facsimile machine, comprising:
    reading means for reading out first image information of an original image to be transmitted;
    transmission means for transmitting said first image information to an external device;
    storage means for storing said read first image information in parallel with a transmission operation by said transmission means;
    operation means for instructing retransmission of the image information stored in said storage means;
    control means for controlling said transmission means to transmit once again the first image information stored in said storage means when said operation means is operated;
    reception means for receiving second image information;
    said storage means storing said received second image information when the reception by said reception means is conducted;
    printing means for printing out the second image information stored in said storage means;
    detection means for detecting that the remaining amount of the storage capacity of said storage means in which no image information is stored comes to a prescribed amount; and
    erasure means for erasing the first image information stored in said storage means in response to a detection output by said detection means.

7. A facsimile machine as recited in claim 6, wherein said erasure means erases the first image information stored in said storage means in response to the detection output by said detection means during the reception operation by said reception means.

8. A facsimile machine as recited in claim 7, further comprising:
    indication means for indicating that the first image information is erased by said erasure means.

9. A facsimile machine as recited in claim 6, wherein said erasure means erases the first image information stored in said storage means in response to the detection output of said detection means during a reading operation by said reading means.

10. A facsimile machine as recited in claim 9, further comprising:
inhibiting means for inhibiting control by said control means when the first image information is erased by said erasure means.

11. A facsimile machine as recited in claim 10, further comprising:
indication means for indicating that the inhibition by said inhibition means is conducted.

12. A facsimile machine as recited in claim 11, further comprising:
indication means for indicating information to determine the contents of the first image information stored in said storage means.

13. A facsimile machine, comprising:
reading means for reading out first image information of an original image to be transmitted;
transmission means for transmitting said read image information to an external device;
storage means for storing said read image information in parallel with a transmission operation by said transmission means;
operation means for instructing retransmission of said stored image information;
control means responsive to operation of said operation means for controlling said transmission means to transmit once again the image information stored in said storage means; and
indication means for indicating whether or not the image information is stored in said storage means.

14. A facsimile machine as recited in claim 13, further comprising:
inhibition means for inhibiting the control by said control means when the image information is not stored in said storage means.

15. A facsimile machine as recited in claim 13, further comprising:
second indication means for indicating information to determine the contents of the image information stored in said storage means.

16. A facsimile machine, comprising:
reading means for reading out image information of an original image to be transmitted;
transmission means for transmitting said read image information to an external device;
storage means for storing said read image information in parallel with a transmission operation by said transmission means;
operation means for instructing retransmission of the image information stored in said storage means;
control means for controlling said transmission means to transmit once again the image information stored in said storage means when said operation means is operated; and
indication means for indicating whether or not transmissible image information is stored in said storage means.

17. A facsimile machine as recited in claim 16, further comprising:
erasure means for erasing the image information stored in said storage means.

18. A facsimile machine as recited in claim 17, further comprising:
inhibition means for inhibiting the control by said control means when erasure is conducted by said erasure means.

19. A facsimile machine, comprising:
reading means for reading out image information of an original image to be transmitted;
transmission means for transmitting said read image information to an external device;
storage means for storing said read image information in parallel with a transmission operation by said transmission means;
operation means for instructing retransmission of said image information stored in said storage means;
control means for controlling said transmission means to transmit once again the image information stored in said storage means when said operation means is operated; and
inhibition means for inhibiting the control by said control means when said storage means does not store any transmissible image information.

20. A facsimile machine, comprising:
reading means for reading out image information of an original image to be transmitted;
transmission means for transmitting said read image information to a destination;
image storage means for storing said read image information in parallel with a transmission operation by said transmission means;
operation means for instructing retransmission of said stored image information;
control means responsive to operation of said operation means for controlling said transmission means to transmit once again said stored image information; and
indication means for indicating information to determine the contents of said stored image information.

21. A facsimile machine as recited in claim 20, further comprising:
clock means for detecting time when said reading means read the original image, and
time storage means for storing the time detected by said clock means,
said indication means indicating the time when the image information stored in said image storage means is read by said reading means based on the stored contents of said time storage means.

22. A facsimile machine as recited in claim 20, further comprising;
detection means for detecting the number of originals of the image read by said reading means, and
original number storage means for storing said detected number of the originals,
said indication means indicating the number of the originals of the image information stored in said image storage means.

23. A facsimile machine as recited in claim 20, further comprising:
designation means for designating a destination to which the image read by said reading means is to be transmitted, and
destination storage means for storing said designated destination,
said transmission means transmitting said read original image to said designated destination,
said indication means indicating the destination stored in said destination storage means.

24. A facsimile machine, comprising:

reading means for reading out image information of an original image to be transmitted;

transmission means for transmitting said read image information to an external device;

storage means for storing said read image information in parallel with a transmission operation by said transmission means;

operation means for instructing retransmission of said stored image information;

control means responsive to operation of said operation means for controlling said transmission means to transmit once again said stored image information; and printing means for printing out information to determine the contents of said stored image information.

25. A facsimile machine, comprising:

reading means for reading out image information of an original image to be transmitted;

transmission means for transmitting said read image information to an external device;

storage means for storing said read image information in parallel with a transmission operation by said transmission means;

operation means for instructing retransmission of said stored image information;

control means responsive to operation of said operation means for controlling said transmission means to transmit once again said stored image information; and inhibition means for inhibiting the control by said control means when the remaining amount of storage capacity of said storage means in which no image information is stored comes to a prescribed amount during a reading operation of the original image by said reading means.

26. A facsimile machine comprising:

reading means for reading out image information of an original image to be transmitted;

storage means for storing said image information from said reading means;

input means for inputting a destination to which the image information is to be transmitted;

transmission means for transmitting said image information to the destination inputted by said input means;

timer means for detecting an elapse of a prescribed time period from completion of a prescribed operation of said facsimile machine;

erasure means responsive to a detection output of said timer means for erasing the image information stored in said storage means; and retransmission means for accepting an input of another destination by said input means while said image information is stored in said storage means and for transmitting said image information stored in said storage means to said another destination inputted by said input means.

27. A facsimile machine comprising:

reading means for reading out image information of an original image to be transmitted;

storage means for storing said image information from said reading means;

input means for inputting a destination to which the image information is to be transmitted;

transmission means for transmitting said image information to the destination inputted by said input means;

detection means for detecting that the remaining amount of a storage capacity of said storage means in which no image information is stored comes to a prescribed amount;

erasure means responsive to a detection output of said detection means for erasing the image information stored in said storage means; and retransmission means for accepting an input of another destination by said input means while said image information is stored in said storage means and for transmitting said image information stored in said storage means to said another destination inputted by said input means.

28. A facsimile machine comprising:

reading means for reading out image information of an original image to be transmitted;

storage means for storing said image information from said reading means;

input means for inputting a destination to which the image information is to be transmitted;

transmission means for transmitting the image information stored by said storage means to the destination inputted by said input means;

retransmission means for accepting an input of another destination by said input means while the said image information is retained in said storage means and for transmitting said image information stored in said storage means to said another destination inputted by said input means;

reception means for receiving other image information to be printed;

erasure means for erasing the image information stored in said storage means and for storing the other image information received by said reception means in said storage means when said other information is received by said reception means; and printing means for printing out said received image information stored in said storage means.

29. A facsimile machine, comprising:

reading means for reading out image information of an original image to be transmitted;

input means for inputting a destination to which the image information is to be transmitted;

transmission means for transmitting said read image information to the destination inputted by said input means;

image storage means for storing said image information from said reading means and for retaining said image information after a transmission of said transmission means;

indication means for indicating information to determine the contents of said stored image information; and retransmission means for accepting an input of another destination by said input means while said image information is retained in said image storage means and for transmitting said image information stored in said storage means to said another destination inputted by said input means.

30. A facsimile machine as recited in claim 29, further comprising:

clock means for detecting a time when said reading means read the original image, and time storage means for storing the time detected by said clock means, said indication means indicating the time when the image information stored in said image storage means is read by said reading means based on stored contents of said time storage means.

31. A facsimile machine as recited in claim 29, further comprising;
  detection means for detecting a number of originals of the image read by said reading means, and
  original number storage means for storing said detected number of originals, said indication means indicating the number of originals of the image information stored in said image storage means.

32. A facsimile machine as recited in claim 29, further comprising:
  destination storage means for storing said destination inputted by said input means, said indication means indicating the destination stored in said destination storage means.

* * * * *